(12) United States Patent
Reddiboyana et al.

(10) Patent No.: US 12,262,425 B2
(45) Date of Patent: Mar. 25, 2025

(54) METHOD AND SYSTEM FOR CONTROLLING 3GPP INTERFACE (E10) BETWEEN N3IWF-C AND N3IWF-U

(71) Applicant: Samsung Electronics Co., Ltd., Suwon-si (KR)

(72) Inventors: Murali Reddiboyana, Bangalore (IN); Naveen Kumar Srinivasa Naidu, Bangalore (IN); Suman Kumar, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 338 days.

(21) Appl. No.: 17/895,576

(22) Filed: Aug. 25, 2022

(65) Prior Publication Data

US 2023/0080351 A1    Mar. 16, 2023

(30) Foreign Application Priority Data

Aug. 26, 2021  (IN) .............. 202141038722
Jul. 27, 2022  (IN) .............. 2021 41038722

(51) Int. Cl.
*H04W 76/10*    (2018.01)
*H04W 92/02*    (2009.01)

(52) U.S. Cl.
CPC ............ *H04W 76/10* (2018.02); *H04W 92/02* (2013.01)

(58) Field of Classification Search
CPC ..... H04W 76/10; H04W 76/12; H04W 76/19; H04W 76/18; H04W 76/32; H04W 92/02; H04W 88/14
See application file for complete search history.

(56) References Cited

U.S. PATENT DOCUMENTS

| | | | |
|---|---|---|---|
| 2019/0044761 A1* | 2/2019 | Kwak | H03M 13/09 |
| 2019/0208563 A1* | 7/2019 | Zee | H04W 76/19 |
| 2021/0127271 A1* | 4/2021 | Wu | H04W 12/0471 |
| 2021/0259044 A1* | 8/2021 | Islam | H04W 52/0229 |

FOREIGN PATENT DOCUMENTS

WO    2019/186504 A1    10/2019

\* cited by examiner

*Primary Examiner* — Rasheed Gidado
(74) *Attorney, Agent, or Firm* — Jefferson IP Law, LLP

(57) ABSTRACT

A method for controlling an execution (signalling) of a non-$3^{rd}$ generation partnership project (3GPP) interworking function (N3IWF) is provided. The method includes splitting a signalling of a N3IWF into a control plane signalling and a user plane signalling, where the control plane signalling is handled by an N3IWF-C device and the user plane signalling is handled by an N3IWF-U device. Further, the method includes adding the E10 interface between the N3IWF-C device and the N3IWF-U device. Further, the method includes monitoring the E10 interface, whereas the E10 interface includes an E10AP. The N3IWF-C device and the N3IWF-U device enables a plurality of services between the N3IWF-C device and the N3IWF-U device. The plurality of services includes an interface management service, a bear management service, a trace management service, and a load management service.

19 Claims, 15 Drawing Sheets

METHOD AND SYSTEM FOR CONTROLLING 3GPP INTERFACE (E10) BETWEEN N3IWF-C AND N3IWF-U

CROSS-REFERENCE TO RELATED APPLICATION(S)

This application is based on and claims priority under 35 U.S.C. § 119(a) of an Indian Provisional patent application number 202141038722, filed on Aug. 26, 2021, in the Indian Intellectual Property Office, and of an Indian Non-Provisional patent application number 202141038722, filed on Jul. 27, 2022, in the Indian Intellectual Property Office, the disclosure of each of which is incorporated by reference herein in its entirety.

BACKGROUND

1. Field

The disclosure relates to a non-$3^{rd}$ generation partnership project (3GPP) interworking function (N3IWF). More particularly, the disclosure relates to a method and system for controlling a 3GPP interface (E10) between an N3IWF-Control plane (N3IWF-C) and N3IWF-User plane (N3IWF-U).

2. Description of Related Art

Control and user plane separation (CUPS) architecture is widely used in fourth generation (4G) and/or fifth generation (5G) core networks. The CUPS architecture is even used in a 5G access network's next generation nodeB (gNB). Where the gNB is split into a gNB-CU-Control Plane (gNB-CU-CP) and a gNB-CU-user plane (gNB-CU-UP). In the 5G access network, an E1 interface is used between the gNB-CU-CP and the gNB-CU-UP, according to 3GPP technical specification (TS) 38.460. Furthermore, the E1 interface uses an E1 application protocol (E1AP), according to 3GPP TS 38.463, for various operations associated with the gNB-CU-CP and the gNB-CU-UP.

In the 5G network, existing non-$3^{rd}$ generation partnership project (3GPP) interworking function (N3IWF) serves a similar function as the gNB. However, the CUPS architecture is not adopted by the existing N3IWF. As a result, the existing N3IWF does not have advantages of the CUPS architecture. For example, the CUPS architecture provides enhancements for separation of functionality (e.g., CP, UP) in an evolved packet core's serving gateway (SGW), a PDN gateway (PGW), and a traffic detection function (TDF). From a network perspective, the separation of functionality has various advantages, such as support for alternative scaling for the CP and the UP, higher capacity per session level in the UP, and so on.

Certain existing systems utilize the CUPS architecture by proprietary interfaces (e.g., N4X). However, the proprietary interfaces have a protocol that is similar to a packet forwarding control protocol (PFCP) that runs on a user datagram protocol (UDP). Furthermore, the PFCP is too heavy for a node like the N3IWF.

Thus, it is desired to address the above-mentioned disadvantages or other shortcomings or at least provide a useful solution for associating the CUPS architecture with the N3IWF.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to introduce control and user plane separation (CUPS) architecture on an N3IWF by splitting the N3IWF into an N3IWF-control plane (N3IWF-C) and N3IWF-user plane (N3IWF-U) and by introducing a new interface (i.e., E10 interface) between the N3IWF-C and the N3IWF-U. As a result, the proposed N3IWF has advantages of the CUPS architecture. For example, the CUPS architecture provides enhancements for separation of functionality (e.g., CP, UP) in an evolved packet core's serving gateway (SGW), PDN gateway (PGW), and traffic detection function (TDF). From a network perspective, the separation of functionality has various advantages, such as support for alternative scaling for the CP and the UP, higher capacity per session level in the UP, and so on.

Another aspect of the disclosure is to provide an E10 application protocol (E10AP) for the E10 interface. The E10AP runs/operates on a stream control transmission protocol (SCTP). The E10 interface will benefit from SCTP features, and the E10AP is a lightweight protocol and higher edge over a proprietary interfaces. As a result, the E10 interface is best suited for the N3IWF/CUPS architecture.

Another aspect of the disclosure is to enable a plurality of services between the N3IWF-C and the N3IWF-U. The plurality of services includes an interface management service, a bear management service, a trace management service, a load management service, or the like.

Additional aspects will be set forth in part in the description which follows and, in part, will be apparent from the description, or may be learned by practice of the presented embodiments.

In accordance with an aspect of the disclosure, a method for controlling an execution (signalling) of a non-$3^{rd}$ generation partnership project (3GPP) interworking function (N3IWF) is provided. The method includes splitting, by an N3IWF-C device and an N3IWF-U device, a signalling of the N3IWF into a control plane signalling and a user plane signalling, where the control plane signalling is handled by an N3IWF control plane (N3IWF-C) device and the user plane signalling is handled by an N3IWF user plane (N3IWF-U) device. Further, the method includes adding, by the N3IWF-C device and the N3IWF-U device, an E10 interface between the N3IWF-C device and the N3IWF-U device. Further, the method includes monitoring, by the N3IWF-C device and the N3IWF-U device, the E10 interface, where the E10 interface comprises an E10 application protocol (E10AP).

In an embodiment of the disclosure, monitoring, by the N3IWF-C device and the N3IWF-U device, the E10 interface includes enabling, by the N3IWF-C device and the N3IWF-U device, a plurality of services between the N3IWF-C device and the N3IWF-U device, where the plurality of services includes an interface management service, a bear management service, a trace management service, and a load management service.

In an embodiment of the disclosure, the E10AP includes user equipment (UE) associated services and non-UE-associated services.

In an embodiment of the disclosure, the E10 interface enables the N3IWF-U device to handle IPSec user plane traffic.

In an embodiment of the disclosure, the N3IWF-C device selects one of the N3IWF-U device from a plurality of the N3IWF-U devices during a protocol data unit (PDU) session establishment based on a local selection mechanism.

In an embodiment of the disclosure, the N3IWF-C device is capable of moving UE context from one N3IWF-U to another N3IWF-U during failure scenarios.

In an embodiment of the disclosure, the interface management service includes a reset service, an error indication service, an N3IWF-U E10 setup service, an N3IWF-U E10 setup response, an N3IWF-U E10 setup failure, an N3IWF-C E10 setup service, an N3IWF-C E10 setup response, an N3IWF-C E10 setup failure, an N3IWF-U configuration update service, an N3IWF-U configuration update acknowledge, an N3IWF-U configuration update failure, an N3IWF-C configuration update service, an N3IWF-C configuration update acknowledge, an N3IWF-C configuration update failure, an N3IWF-C configuration service, an E10 release service, and an N3IWF-U status indication service.

In an embodiment of the disclosure, the bear management service includes a bearer context setup service, a bearer context release request for the N3IWF-C device, a bearer context release request for the N3IWF-U device, a bearer context modification for the N3IWF-U device, a bearer context modification for the N3IWF-C device, a bearer context inactivity notification service, and a data usage report service.

In an embodiment of the disclosure, the trace management service includes a trace start service and a deactivate trace service.

In an embodiment of the disclosure, the load management service includes a resource status reporting initiation service and a resource status reporting service.

In accordance with another aspect of the disclosure, a N3IWF-C device for controlling the execution (signalling) of the N3IWF is provided. The N3IWF-C device includes an interface controller coupled with a processor and a memory. The interface controller splits the signalling of the N3IWF into the control plane signalling, where the control plane signalling is handled by the N3IWF-C device. Further, the interface controller adds the E10 interface between the N3IWF-C device and the N3IWF-U device. Further, the interface controller monitors the E10 interface, where the E10 interface includes the E10AP.

In accordance with another aspect of the disclosure, N3IWF-U device for controlling the execution (signalling) of the N3IWF is provided. The N3IWF-U device includes an interface controller coupled with a processor and a memory. The interface controller splits the signalling of the N3IWF into the user plane signalling, where the user plane signalling is handled by the N3IWF-U device. Further, the interface controller adds the E10 interface between the N3IWF-C device and the N3IWF-U device. Further, the interface controller monitors the E10 interface, where the E10 interface includes the E10AP.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
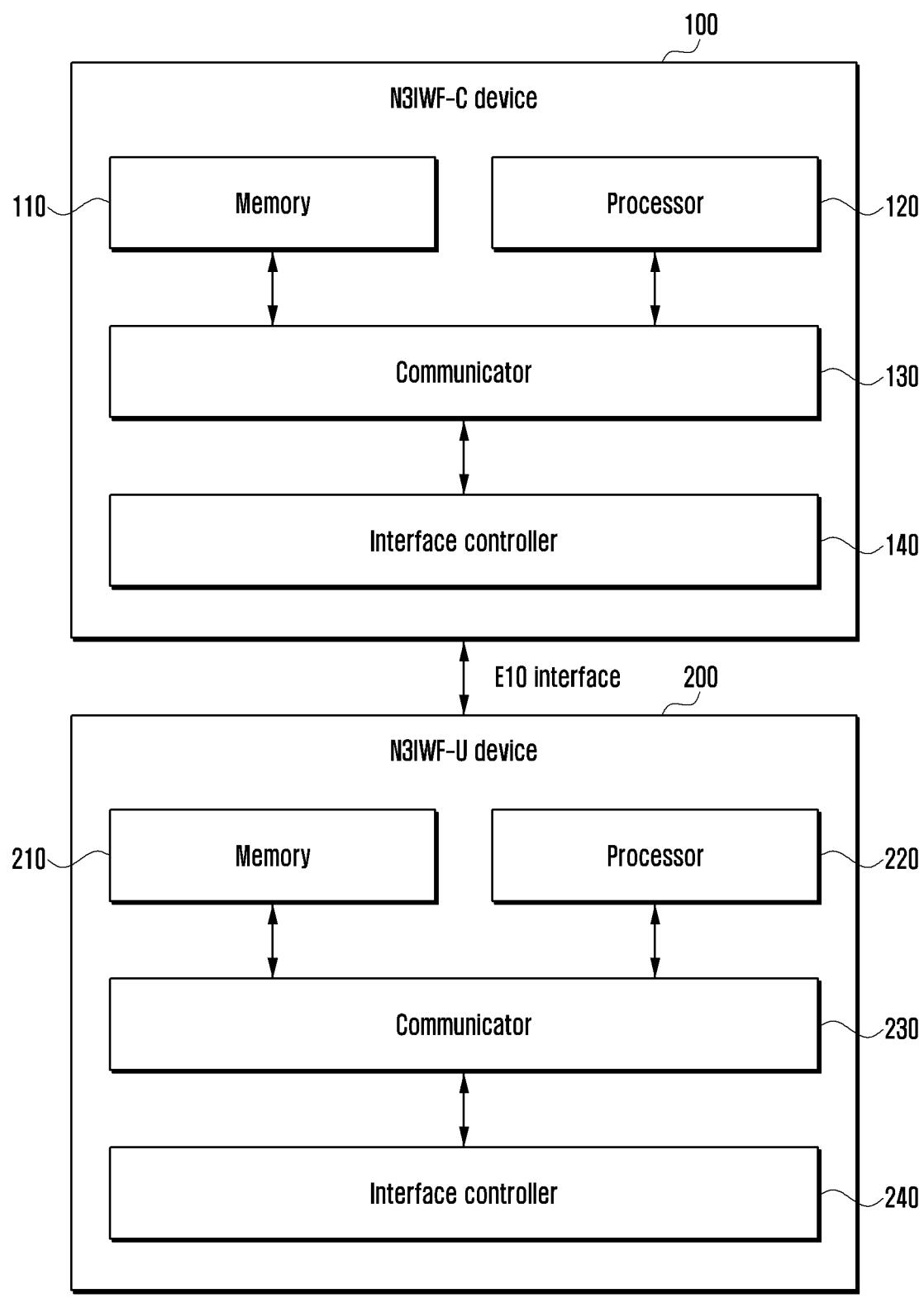
FIG. 1 illustrates a system block diagram of a non-3rd generation partnership project (3GPP) interworking function (N3IWF) device for controlling an execution of signalling services according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In addition, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits, such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports, such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, or the like, may be used herein to describe various elements, these elements should not be limited by these terms. These terms are generally only used to distinguish one element from another.

Throughout this disclosure, the terms "N3IWF-C" and "N3IWF-C device" are used interchangeably and means the same. The terms "N3IWF-U" and "N3IWF-U device" are used interchangeably and means the same.

Accordingly, the embodiment herein is to provide a method for controlling an execution (signalling) of a non-3rd generation partnership project (3GPP) interworking function (N3IWF). The method includes splitting, by a N3IWF-C device and the N3IWF-U device, a signalling of the N3IWF into a control plane signalling and a user plane signalling, where the control plane signalling is handled by an N3IWF Control plane (N3IWF-C) device and the user plane signalling is handled by an N3IWF User plane (N3IWF-U) device. Further, the method includes adding, by the N3IWF-C device and the N3IWF-U device, an E10 interface between the N3IWF-C device and the N3IWF-U device. Further, the method includes monitoring, by the N3IWF-C device and the N3IWF-U device, the E10 interface, where the E10 interface comprises an E10 application protocol (E10AP).

Accordingly, the embodiment herein is to provide the N3IWF-C device for controlling the execution (signalling) of the N3IWF. The N3IWF-C device includes an interface controller coupled with a processor and a memory. The interface controller splits the signalling of the N3IWF into the control plane signalling, where the control plane signalling is handled by the N3IWF-C device. Further, the interface controller adds the E10 interface between the N3IWF-C device and the N3IWF-U device. Further, the interface controller monitors the E10 interface, where the E10 interface includes the E10AP.

Accordingly, the embodiment herein is to provide the N3IWF-U device for controlling the execution (signalling) of the N3IWF. The N3IWF-U device includes an interface controller coupled with a processor and a memory. The interface controller splits the signalling of the N3IWF into the user plane signalling, where the user plane signalling is handled by the N3IWF-U device. Further, the interface controller adds the E10 interface between the N3IWF-C device and the N3IWF-U device. Further, the interface controller monitors the E10 interface, where the E10 interface includes the E10AP.

Unlike existing methods and systems, the proposed method allows the N3IWF-C device and the N3IWF-U device to introduce control and user plane separation (CUPS) architecture splitting the N3IWF into the N3IWF-C and the N3IWF-U and by introducing a new interface (i.e., E10 interface) between the N3IWF-C and the N3IWF-U. As a result, the proposed N3IWF-C device and N3IWF-U device has advantages of the CUPS architecture. For example, the CUPS architecture provides enhancements for separation of functionality (e.g., CP, UP) in an evolved packet core's serving gateway (SGW), a PDN gateway (PGW), and a traffic detection function (TDF). From a network perspective, the separation of functionality has various advantages, such as support for alternative scaling for the CP and the UP, higher capacity per session level in the UP, and so on.

Unlike existing methods and systems, the proposed method allows the N3IWF-C device and the N3IWF-U device to provide the E10AP for the E10 interface. The E10AP runs/operates on a stream control transmission protocol (SCTP). The E10 interface will benefit from SCTP features, and the E10AP is a lightweight protocol and higher edge over a proprietary interfaces. As a result, the E10 interface is best suited for the N3IWF/CUPS architecture.

Unlike existing methods and systems, the proposed method allows the N3IWF-C device and the N3IWF-U device to enable a plurality of services between the N3IWF-C and the N3IWF-U. The plurality of services includes an interface management service, a bear management service, a trace management service, a load management service, or the like.

Furthermore, the N3IWF CUPS architecture is only functional when both the UE and the N3IWF-C device and the N3IWF-U device support IKE SA cloning (CLONE IKE SA SUPPORTED) as defined in RFC 7791. IKE SA cloning is not mentioned in the 3GPP release 16 and 17 specifications. As a result, the proposed method is to amend 3GPP standards to include RFC 7791. Furthermore, when creating a user plane IP sect SA (security association), the N3IWF-C device and the N3IWF-U device includes CLONE IKE SA in CREATE CHILD SA message. This information is currently not specified in 3GPP 24.502.

Referring now to the drawings and more particularly to FIGS. 1, 2, 3, 4A to 4E, and 5A to 5G, where similar reference characters denote corresponding features consistently throughout the figures, there are shown preferred embodiments.

FIG. 1 illustrates a system block diagram of a non-3$^{rd}$ generation partnership project (3GPP) interworking function for controlling an execution of signalling services (e.g., control plane signalling, user plane signalling, or the like), according to an embodiment of the disclosure.

Referring to FIG. 1, in an embodiment of the disclosure, the N3IWF-C device (100) includes a memory (110), a processor (120), a communicator (130), and an interface controller (140).

In an embodiment of the disclosure, the memory (110) stores a plurality of service information (e.g., an interface management service, a bear management service, a trace management service, a load management service, or the like). The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in random access memory (RAM) or cache). The memory (110) can be an internal storage unit or it can be an external storage unit of the N3IWF-C device (100), a cloud storage, or any other type of external storage.

The processor (120) communicates with the memory (110), the communicator (130), and the interface controller (140). The processor (120) is configured to execute instructions stored in the memory (110) and to perform various processes. The processor (120) may include one or a plurality of processors, may be a general-purpose processor, such as a central processing unit (CPU), an application processor (AP), or the like, a graphics-only processing unit, such as a graphics processing unit (GPU), a visual processing unit (VPU), and/or an Artificial intelligence (AI) dedicated processor, such as a neural processing unit (NPU).

The communicator (130) is configured for communicating internally between internal hardware components and with external devices (e.g., eNodeB, gNodeB, server, or the like) via one or more networks (e.g., Radio technology). The communicator (130) includes an electronic circuit specific to a standard that enables wired or wireless communication.

The interface controller (140) is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards, and the like.

In an embodiment of the disclosure, the interface controller (140) splits a signalling of the N3IWF into a control plane signalling and a user plane signalling. The control plane signalling is handled by the N3IWF-C device (100). Furthermore, the interface controller (140) adds an E10 interface between the N3IWF-C device (100) and an N3IWF-U device (200). Furthermore, the interface controller (140) monitors the E10 interface.

The E10 interface includes an E10 application protocol (E10AP). The E10AP runs on a stream control transmission protocol (SCTP) of a transport layer. The E10AP includes user equipment (UE) associated services and non-UE-associated services. The UE-associated services are related to one user equipment (UE) (not shown in FIG. 1). The E10AP provides the UE-associated services that are associated with a UE-associated signalling connection that is maintained for the UE. The non-UE-associated services are related to the E10 interface instance between the N3IWF-C device (100) and the N3IWF-U device (200) utilising a non-UE-associated signalling connection. Furthermore, the E10 interface enables the N3IWF-U device (200) to handle IPSec user plane traffic. Furthermore, the N3IWF-C device (100) selects one of the N3IWF-U device (200) from a plurality of the N3IWF-U device(s) (200) during a protocol data unit (PDU) session establishment based on a local selection mechanism. Furthermore, the N3IWF-C device (100) is capable of moving UE context from one N3IWF-U device (200a) to another N3IWF-U device (200b) during failure scenarios.

Furthermore, the interface controller (140) enables a plurality of services between the N3IWF-C device (100) and the N3IWF-U device (200). Where a plurality of messages exchanged between the N3IWF-C device (100) and the N3IWF-U device (200), explained in FIGS. 5A to 5G. The plurality of services includes the interface management service, the bear management service, the trace management service, and the load management service.

The interface management service includes a reset service, an error indication service, an N3IWF-U E10 setup service, an N3IWF-U E10 setup response, an N3IWF-U E10 setup failure, an N3IWF-C E10 setup service, an N3IWF-C E10 setup response, an N3IWF-C E10 setup failure, an N3IWF-U configuration update service, an N3IWF-U configuration update acknowledge, an N3IWF-U configuration update failure, an N3IWF-C configuration update service, an N3IWF-C configuration update acknowledge, an N3IWF-C configuration update failure, an N3IWF-C configuration service, an E10 release service, and an N3IWF-U status indication service. The bear management service includes a bearer context setup service, a bearer context release request for the N3IWF-C device (100), a bearer context release request for the N3IWF-U device (200), a bearer context modification for the N3IWF-U device (200), a bearer context modification for the N3IWF-C device (100), a bearer context inactivity notification service, and a data usage report service. The trace management service includes a trace start service and a deactivate trace service. The load management service includes a resource status reporting initiation service and a resource status reporting service.

In an embodiment of the disclosure, the N3IWF-U device (200) includes a memory (210), a processor (220), a communicator (230), and an interface controller (240).

In an embodiment of the disclosure, the memory (210) stores a plurality of service information (e.g., an interface management service, a bear management service, a trace management service, a load management service, or the like). The memory (210) stores instructions to be executed by the processor (220). The memory (210) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210) may, in some examples, be considered a non-transitory storage medium. The term "non-transitory" may indicate that the storage medium is not embodied in a carrier wave or a propagated signal. However, the term "non-transitory" should not be interpreted that the memory (210) is non-movable. In some examples, the memory (210) can be configured to store larger amounts of information than the memory. In certain examples, a non-transitory storage medium may store data that can, over time, change (e.g., in random access memory (RAM) or cache). The memory (210) can be an internal storage unit or it can be an external storage unit of the N3IWF-U device (200), a cloud storage, or any other type of external storage.

The processor (220) communicates with the memory (210), the communicator (230), and the interface controller (240). The processor (220) is configured to execute instructions stored in the memory (210) and to perform various processes. The processor (220) may include one or a plurality of processors, may be a general-purpose processor, such as a central processing unit (CPU), an application processor (AP), or the like, a graphics-only processing unit, such as a graphics processing unit (GPU), a visual processing unit (VPU), and/or an Artificial intelligence (AI) dedicated processor, such as a neural processing unit (NPU).

The communicator (230) is configured for communicating internally between internal hardware components and with external devices (e.g., eNodeB, gNodeB, server, or the like) via one or more networks (e.g., radio technology). The communicator (230) includes an electronic circuit specific to a standard that enables wired or wireless communication.

The interface controller (240) is implemented by processing circuitry, such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports, such as printed circuit boards and the like.

In an embodiment of the disclosure, the interface controller (240) splits a signalling of the N3IWF into a user plane signalling. The user plane signalling is handled by the N3IWF-U device (200). Furthermore, the interface controller (240) adds the E10 interface between the N3IWF-C device (100) and the N3IWF-U device (200). Furthermore, the interface controller (240) monitors the E10 interface.

The E10 interface includes the E10 application protocol (E10AP). The E10AP runs on the SCTP of the transport layer. The E10AP includes the UE associated services and the non-UE-associated services. The UE-associated services are related to one user equipment (UE) (not shown in FIG. 1). The E10AP provides the UE-associated services that are associated with the UE-associated signalling connection that is maintained for the UE. The non-UE-associated services are related to the E10 interface instance between the N3IWF-C device (100) and the N3IWF-U device (200) utilising the non-UE-associated signalling connection. Furthermore, the E10 interface enables the N3IWF-U device (200) to handle the IPSec user plane traffic. Furthermore, the N3IWF-C device (100) selects one of the N3IWF-U device (200) from the plurality of the N3IWF-U device(s) (200) during a protocol data unit (PDU) session establishment based on the local selection mechanism. Furthermore, the N3IWF-C device (100) is capable of moving UE context from one N3IWF-U device (200a) to another N3IWF-U device (200b) during failure scenarios.

Furthermore, the interface controller (240) enables a plurality of services between the N3IWF-C device (100) and the N3IWF-U device (200). Where the plurality of messages exchanged between the N3IWF-C device (100) and the N3IWF-U device (200), explained in FIGS. 5A to 5G. The plurality of services includes the interface management service, the bear management service, the trace management service, and the load management service.

The interface management service includes the reset service, an error indication service, the N3IWF-U E10 setup service, an N3IWF-U E10 setup response, the N3IWF-U E10 setup failure, the N3IWF-C E10 setup service, the N3IWF-C E10 setup response, the N3IWF-C E10 setup failure, the N3IWF-U configuration update service, the N3IWF-U configuration update acknowledge, the N3IWF-U configuration update failure, the N3IWF-C configuration update service, the N3IWF-C configuration update acknowledge, the N3IWF-C configuration update failure, the N3IWF-C configuration service, the E10 release service, and the N3IWF-U status indication service. The bear management service includes the bearer context setup service, the bearer context release request for the N3IWF-C device (100), the bearer context release request for the N3IWF-U device (200), the bearer context modification for the N3IWF-U device (200), the bearer context modification for the N3IWF-C device (100), the bearer context inactivity notification service, and the data usage report service. The trace management service includes the trace start service and the deactivate trace service. The load management service includes the resource status reporting initiation service and the resource status reporting service.

Although the FIG. 1 shows various hardware components of the system but it is to be understood that other embodiments are not limited thereon. In other embodiments of the disclosure, the system may include a number of components. Further, the labels or names of the components are used only for illustrative purpose and does not limit the scope of the disclosure. One or more components can be combined to perform the same or substantially similar function to control the execution of the N3IWF.

Figure 2:
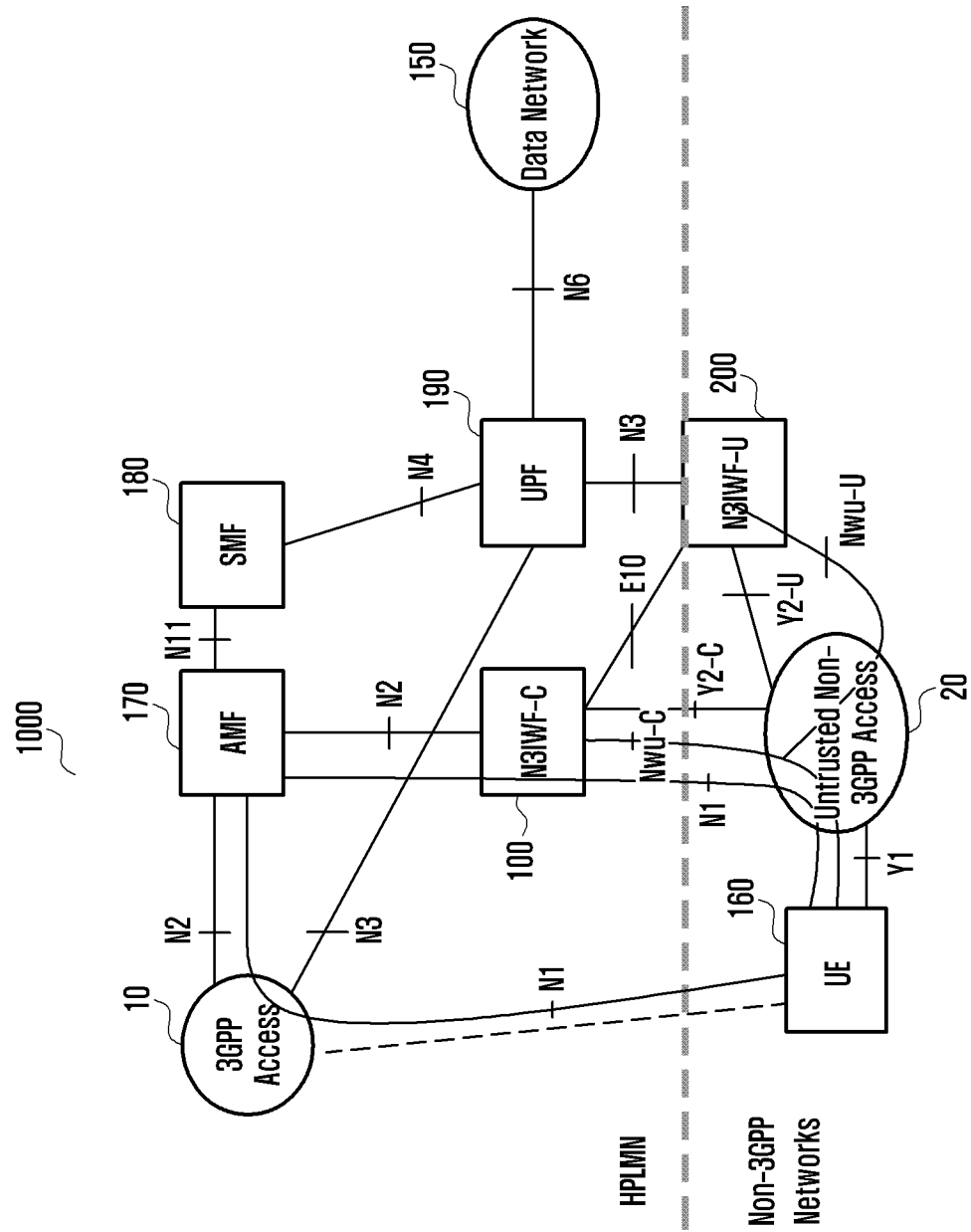
FIG. 2 illustrates a control and user plane separation (CUPS) architecture for controlling an execution of signalling services according to an embodiment of the disclosure.

FIG. 2 illustrates a control and user plane separation (CUPS) architecture for controlling an execution of signalling services according to an embodiment of the disclosure.

Referring to FIG. 2, the CUPS architecture (1000) on the N3IWF-C device (100) and the N3IWF-U device (200) includes a plurality of network entities. The plurality of network entities includes a user equipment (UE) (160), an access and mobility management function (AMF) (170), a session management function (SMF) (180), a user plane function (UPF) (190), a data network (150), a 3GPP access (10), an untrusted 3GPP access (20), the N3IWF-C device (100) and the N3IWF-U device (200). Furthermore, the plurality of network entities communicates with each other with a various network interface(s) (e.g., Y1, Y2-C, Y2-U, N1, N3, N4, N6, N11, E10, or the like) as per 3GPP specification.

In an embodiment of the disclosure, a N3IWF device is divided into the N3IWF-C device (100) and the N3IWF-U device (200). All control plane signalling is handled by the N3IWF-C device (100) and user plane signalling is handled by the N3IWF-U device (200). The E10 interface is introduced between the N3IWF-C device (100) and the N3IWF-U device (200). The N2 interface is used between the AMF (170) and the N3IWF-C device (100). The N3 interface is used between the UPF (190) and the N3IWF-U device (200). All the control plane signalling from the UE (160) towards the core network goes via the N3IWF-C device (100). All the user plane data goes from the UE (160) towards the data network (150) and goes via the N3IWF-U device (200).

Figure 3:
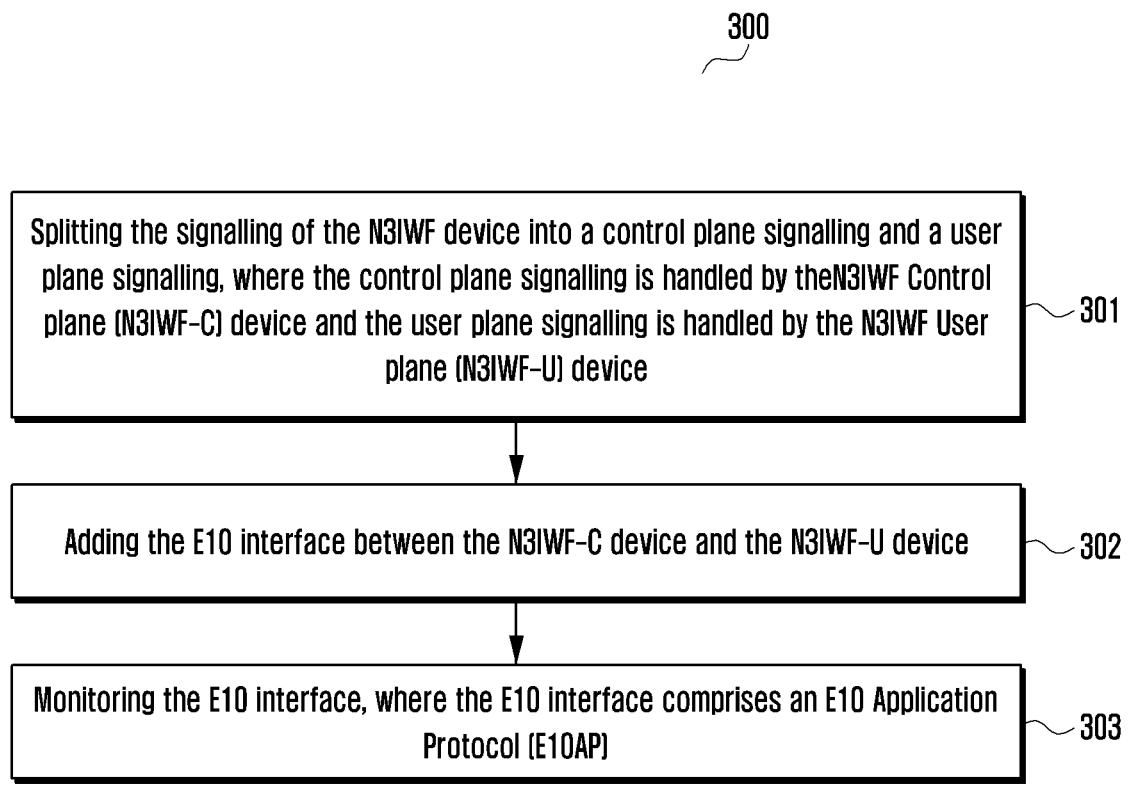
FIG. 3 is a flow diagram illustrating a method for controlling an execution of signalling services for a CUPS architecture according to an embodiment of the disclosure.

FIG. 3 is a flow diagram (300) illustrating a method for controlling an execution of signalling services for a CUPS architecture according to an embodiment of the disclosure.

Referring to FIG. 3, operations 301 to 303 are performed by the N3IWF-C device (100) and the N3IWF-U device (200).

At operation 301, the method includes splitting the signalling of the N3IWF into the control plane signalling and the user plane signalling, where the control plane signalling is handled by the N3IWF-C device (100) and the user plane signalling is handled by the N3IWF-U device (200). At operation 302, the method includes adding the E10 interface between the N3IWF-C device (100) and the N3IWF-U device (200). At operation 303, the method includes monitoring the E10 interface, where the E10 interface comprises the E10AP.

The various actions, acts, blocks, steps, or the like in the flow diagram (300) may be performed in the order presented, in a different order or simultaneously. Further, in some embodiments of the disclosure, some of the actions, acts, blocks, steps, or the like may be omitted, added, modified, skipped, or the like without departing from the scope of the disclosure.

Figure 4A:
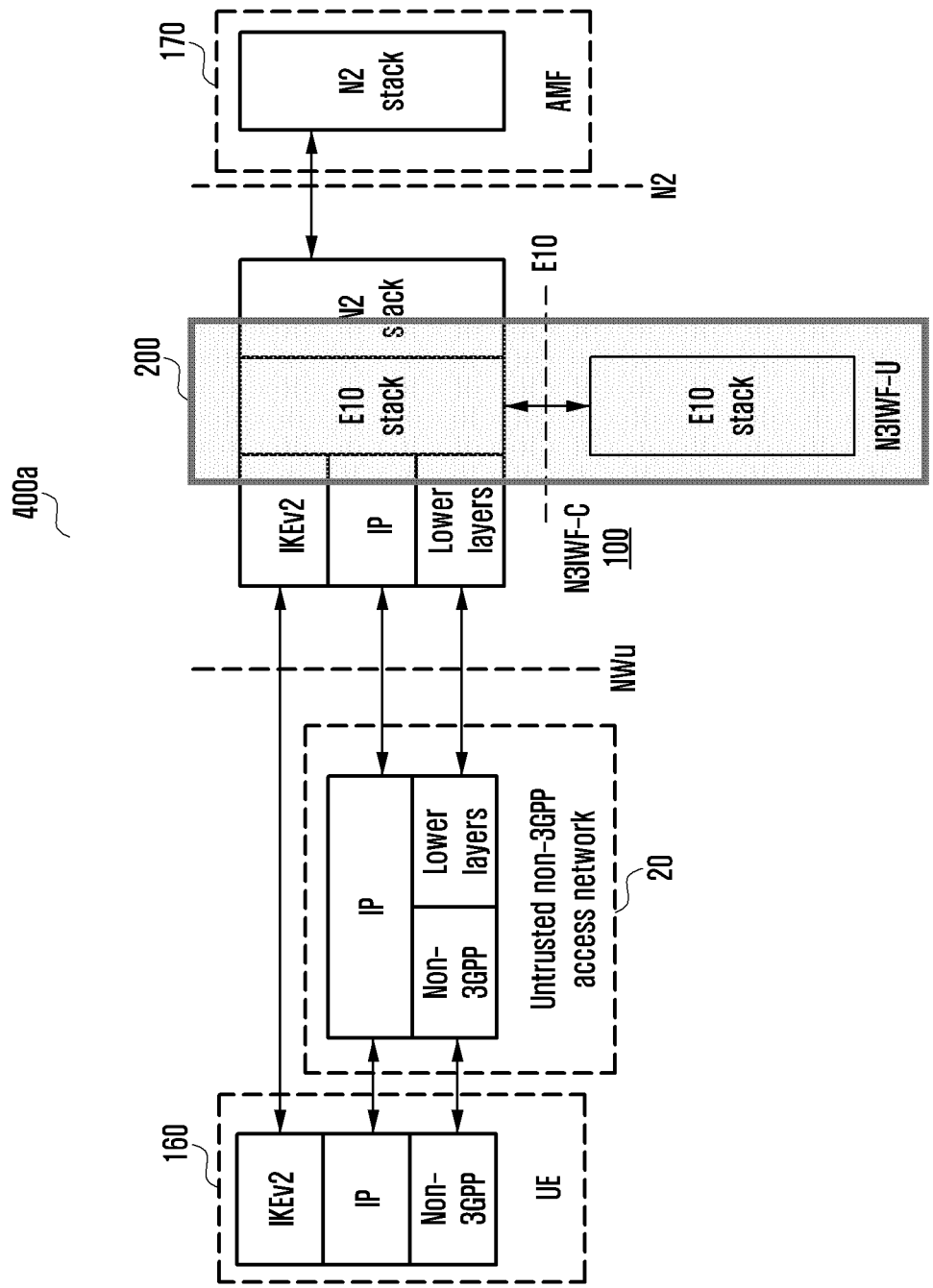
FIG. 4A illustrates signalling services between various network entities for user plane establishment according to an embodiment of the disclosure.

FIG. 4A illustrates signalling services between various network entities for user plane establishment (400a) according to an embodiment of the disclosure.

Referring to FIG. 4A, the various network entities include the UE (160), the untrusted non-3GPP access network (20), the N3IWF-C device (100), the N3IWF-U device (200), and the AMF (170).

In an embodiment of the disclosure, the N3IWF-C device (100) and the N3IWF-U device (200) run the E10 stack (new interface).

Figure 4B:
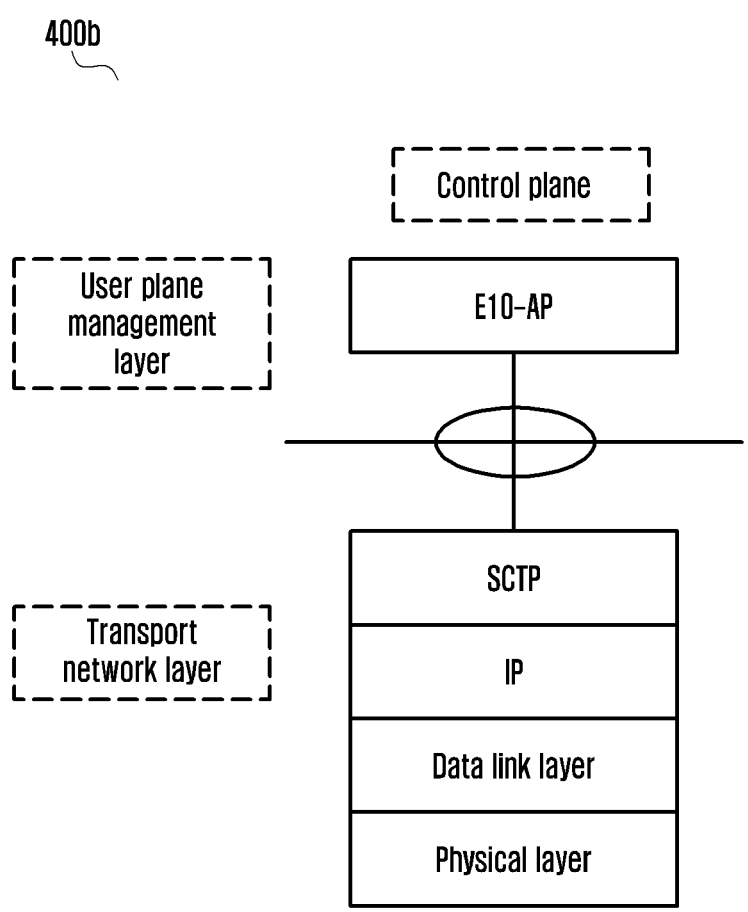
FIG. 4B illustrates an E10 interface protocol structure for a CUPS architecture according to an embodiment of the disclosure.

FIG. 4B illustrates an E10 Interface protocol structure (400b) for a CUPS architecture according to an embodiment of the disclosure.

Referring to FIG. 4B, in an embodiment of the disclosure, the E10 interface has E10AP that runs on top of the SCTP. Furthermore, the E10AP has UE-associated services and non-UE-associated services. Furthermore, the E10AP supports the interface management service, the bearer management service, and other necessary services/features, as explained in FIGS. 5A to 5G.

Figure 4C:
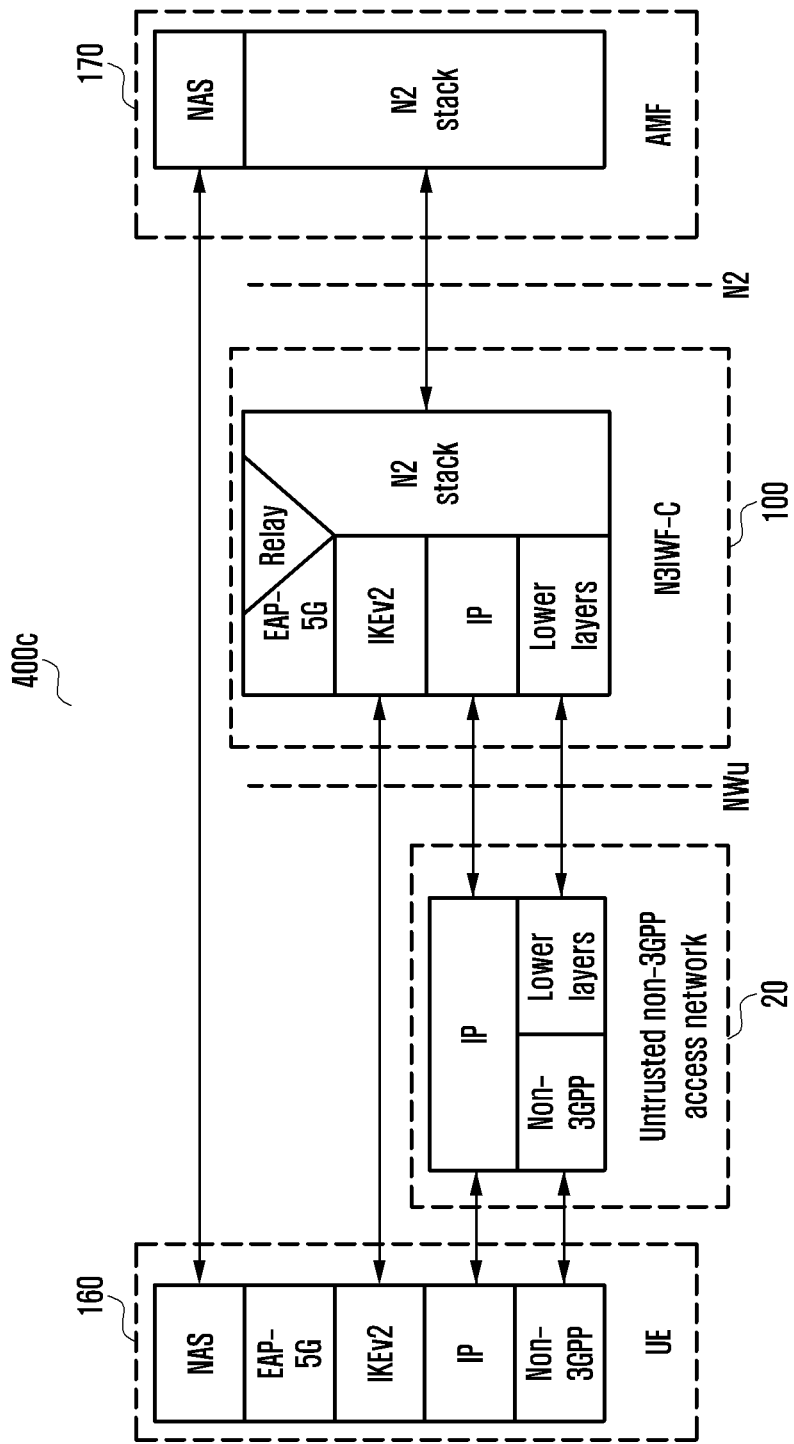
FIGS. 4C and 4D illustrates an IKEv2 protocol scenario & an IPSec protocol scenario for a CUPS architecture according to various embodiments of the disclosure.
Figure 4D:
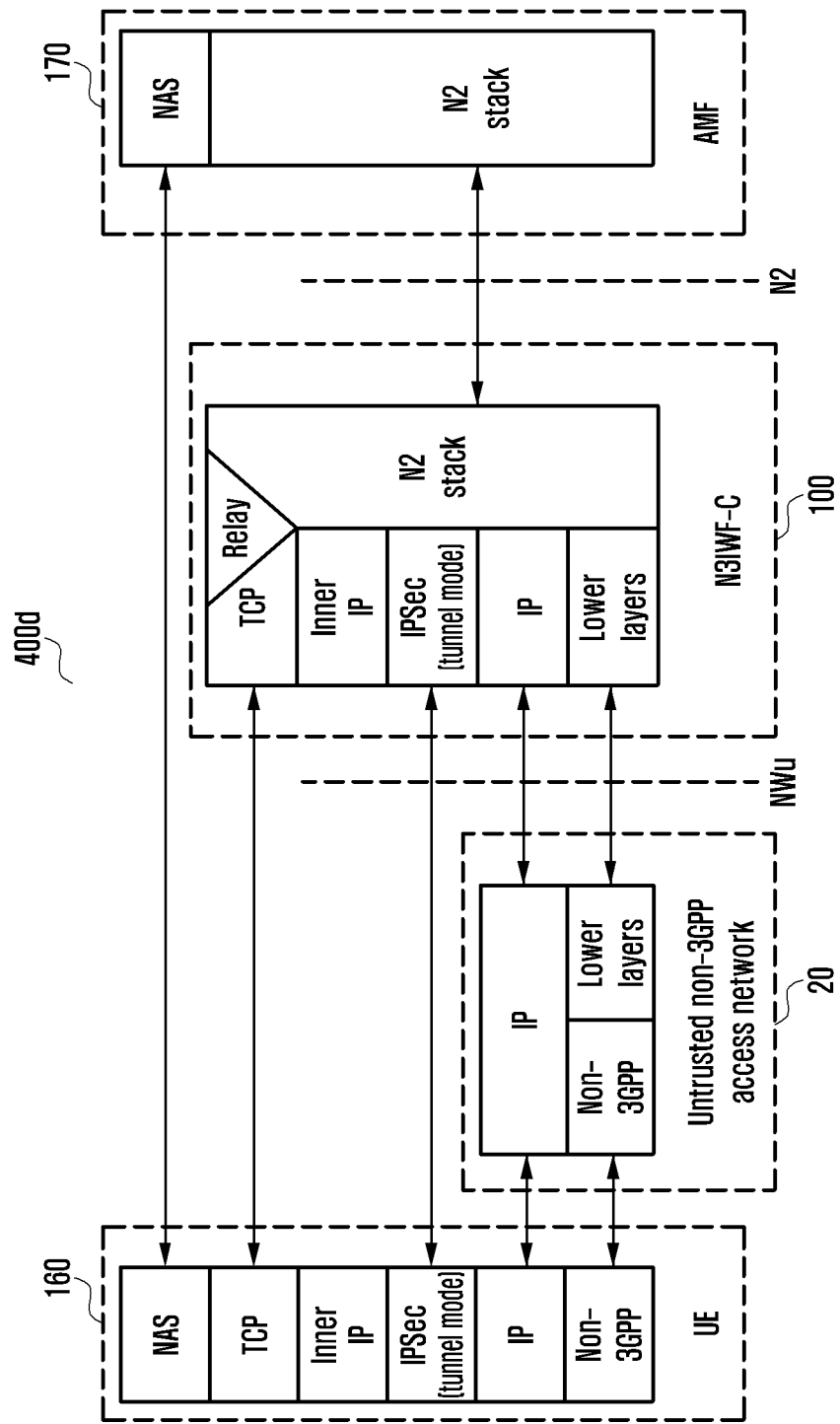

FIGS. 4C and 4D illustrates an IKEv2 protocol scenario & an IPSec protocol scenario for a CUPS architecture according to various embodiments of the disclosure.

Referring to FIGS. 4C and 4D, a system (400c, 400d) includes the UE (160), the untrusted non-3GPP access network (20), the N3IWF-C device (100), and the AMF (170). In the proposed N3IWF CUPS architecture, all the control plane protocols are moved to the N3IWF-C device (100). Otherwise, extensible authentication protocol (EAP)-5G, an Internet key exchange version 2 (IKEv2), a transmission control protocol (TCP), and an Internet protocol security (IPSec) are existing protocols on standalone N3IWF (existing 3GPP architecture), no new protocols are proposed.

Figure 4E:
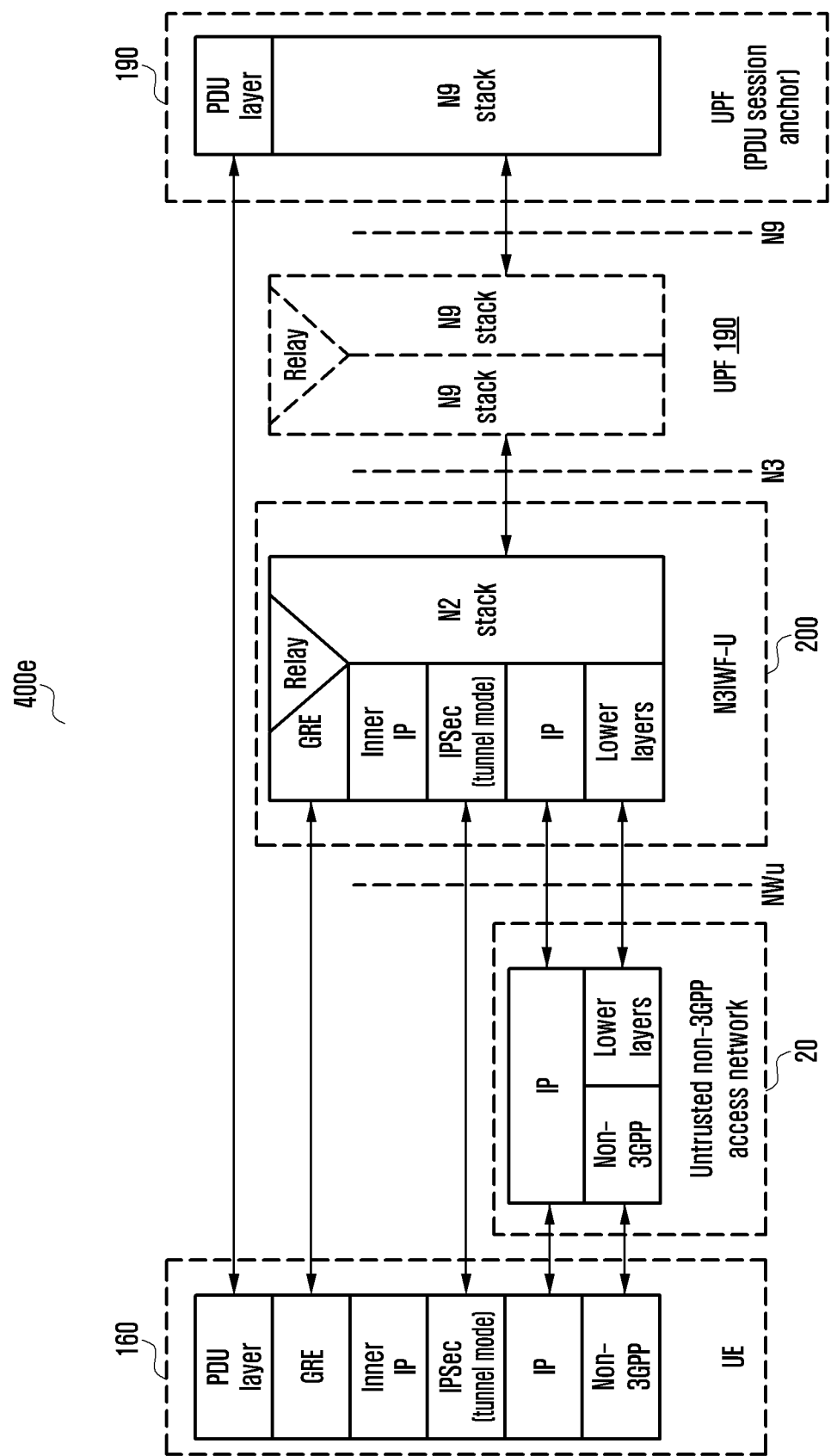
FIG. 4E illustrates signalling services between various network entities for user plane connectivity according to an embodiment of the disclosure.

FIG. 4E illustrates signalling services between various network entities for user plane connectivity (400e) according to an embodiment of the disclosure.

Referring to FIG. 4E, the various network entities include the UE (160), the untrusted non-3GPP access network (20), the N3IWF-U device (200), the N3IWF-U device (200), and the UPF (190).

In the proposed N3IWF CUPS architecture, all the user plane protocols are moved to the N3IWF-U device (200). Otherwise, a generic routing encapsulation (GRE), IPSec are existing protocols on standalone N3IWF (existing 3GPP architecture), and no new protocols are proposed.

FIGS. 5A, 5B, 5C, 5D, 5E, 5F, and 5G are sequential diagrams illustrating the plurality of services between the N3IWF-C device (100) and the N3IWF-U device (200), according to various embodiments of the disclosure.

All the messages of the E10AP are newly defined. The E10 interface and the E10AP may be similar to the E1 interface (3GPP TS 38.460) and the E1AP (3GPP TS 38.463) at a high level, but the messages and information elements (IEs) of the E10AP will have N3IWF specific details, the same is explained in sequence flow diagram 500a to 500z3.

Figure 5A:
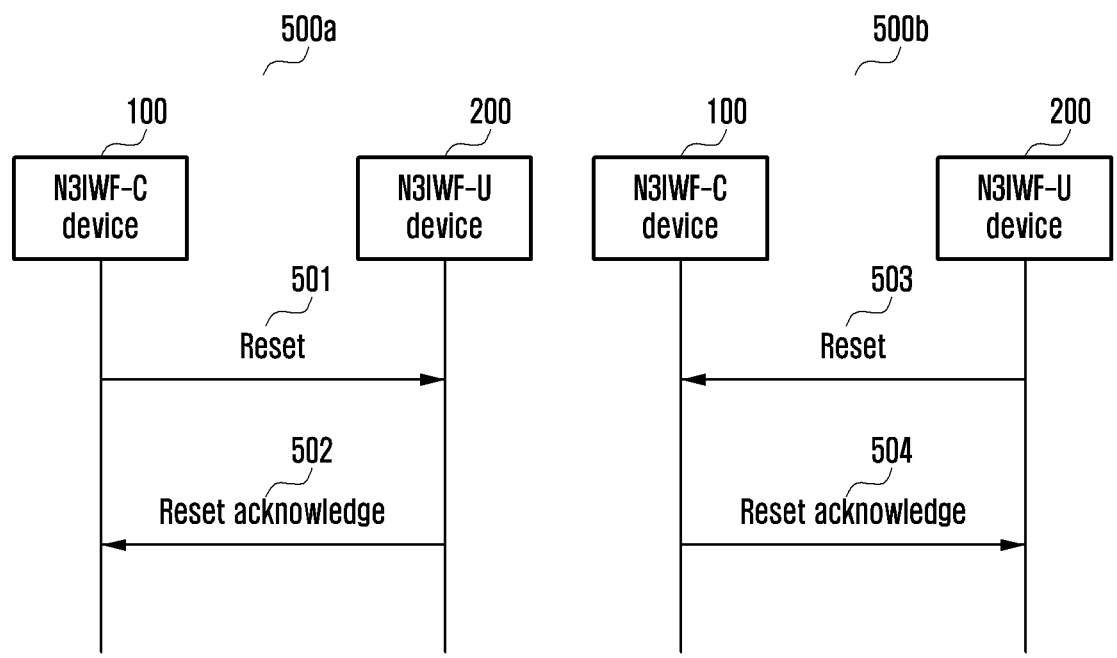
FIGS. 5A, 5B, 5C, 5D, 5E, 5F, and 5G are sequential diagrams illustrating a plurality of services between an N3IWF-C and an N3IWF-U according to various embodiments of the disclosure.
Figure 5A:
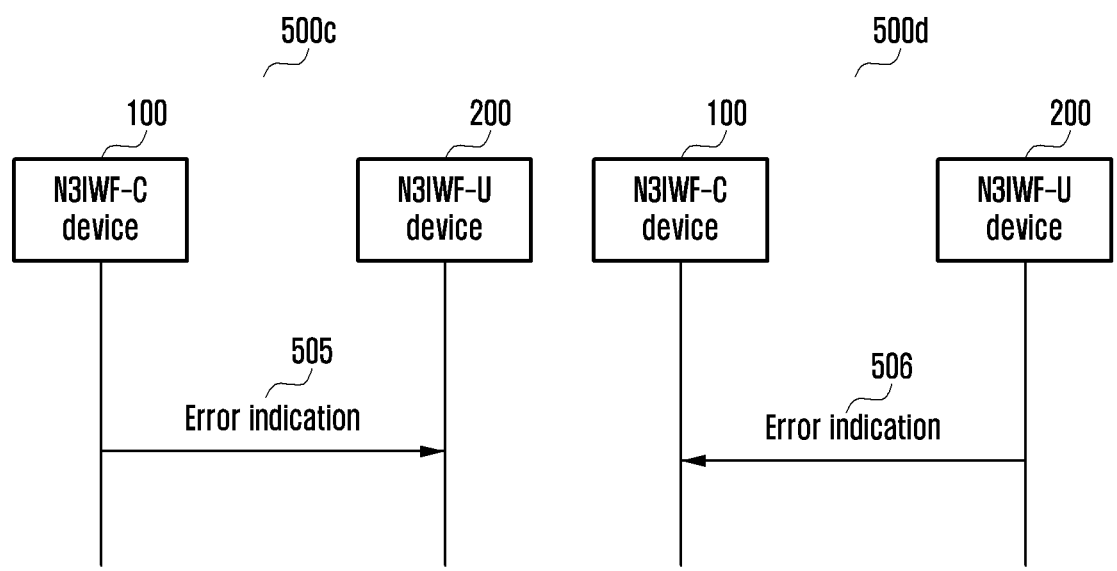

FIG. 5A illustrates the plurality of services between the N3IWF-C device (100) and the N3IWF-U device (200). The plurality of services includes the reset service, the reset acknowledgement, and the error indication service.

Referring to sequence flow diagram 500a: at 501, the N3IWF-C device (100) sends the reset service (e.g., reset message) to the N3IWF-U device (200). At 502, the N3IWF-U device (200) sends the reset acknowledgement (e.g., reset acknowledgement message) to the N3IWF-C device (100) in response to receiving the reset service from the N3IWF-C device (100).

Referring to sequence flow diagram 500b: at 503, the N3IWF-U device (200) sends the reset service (e.g., reset message) to the N3IWF-C device (100). At 504, the N3IWF-C device (100) sends the reset acknowledgement (e.g., reset acknowledgement message) to the N3IWF-U device (200) in response to receiving the reset service from the N3IWF-U device (200).

In an embodiment of the disclosure, the IEs for the reset service are listed in the Table 1 below.

TABLE 1

| IE/Group Name | Presence | Range |
|---|---|---|
| Message Type | M | |
| Transaction ID | M | |
| Cause | M | |
| CHOICE Reset Type | M | |
| >E10 interface | | |
| >>Reset All | M | |
| >Part of E10 interface | | |
| >>UE-associated logical E10-connection list | | 1 |
| >>>UE-associated logical E10-connection Item | | 1 ... <maxnoofIndividualE10ConnectionsToReset> |
| >>>>N3IWF-C UE E10AP ID | O | |
| >>>>N3IWF-U UE E10AP ID | O | |

Where maxnoofIndividualE10ConnectionsToReset is maximum no. of UE-associated logical E10-connections allowed to reset in one message, the value is 65536.

In an embodiment of the disclosure, the IEs for the reset acknowledgement are listed in the Table 2 below.

TABLE 2

| IE/Group Name | Presence | Range |
|---|---|---|
| Message Type | M | |
| Transaction ID | M | |
| UE-associated logical E10-connection list | | 0 . . . 1 |
| >UE-associated logical E10-connection Item | | 1 . . . <maxnoofIndividualE10ConnectionsToReset> |
| >>N3IWF-C UE E10AP ID | O | |
| >>N3IWF-U UE E10AP ID | O | |
| Criticality Diagnostics | O | |

Where maxnoofIndividualE10ConnectionsToReset is maximum no. of UE-associated logical E10-connections allowed to reset in one message, the value is 65536.

Referring to sequence flow diagram 500c: at 505, the N3IWF-C device (100) sends the error indication service (e.g., error indication message) to the N3IWF-U device (200) to indicate that some error has been detected in a node (i.e., the N3IWF-C device (100)).

Referring to sequence flow diagram 500d: at 506, the N3IWF-U device (200) sends the error indication service to the N3IWF-C device (100) to indicate that some error has been detected in a node (i.e., the N3IWF-U device (200)).

In an embodiment of the disclosure, the IEs for the error indication service are listed in the Table 3 below.

TABLE 3

| IE/Group Name | Presence |
|---|---|
| Message Type | M |
| Transaction ID | M |
| N3IWF-C UE E10AP ID | O |
| N3IWF-U UE E10AP ID | O |
| Cause | O |
| Criticality Diagnostics | O |

Figure 5B:
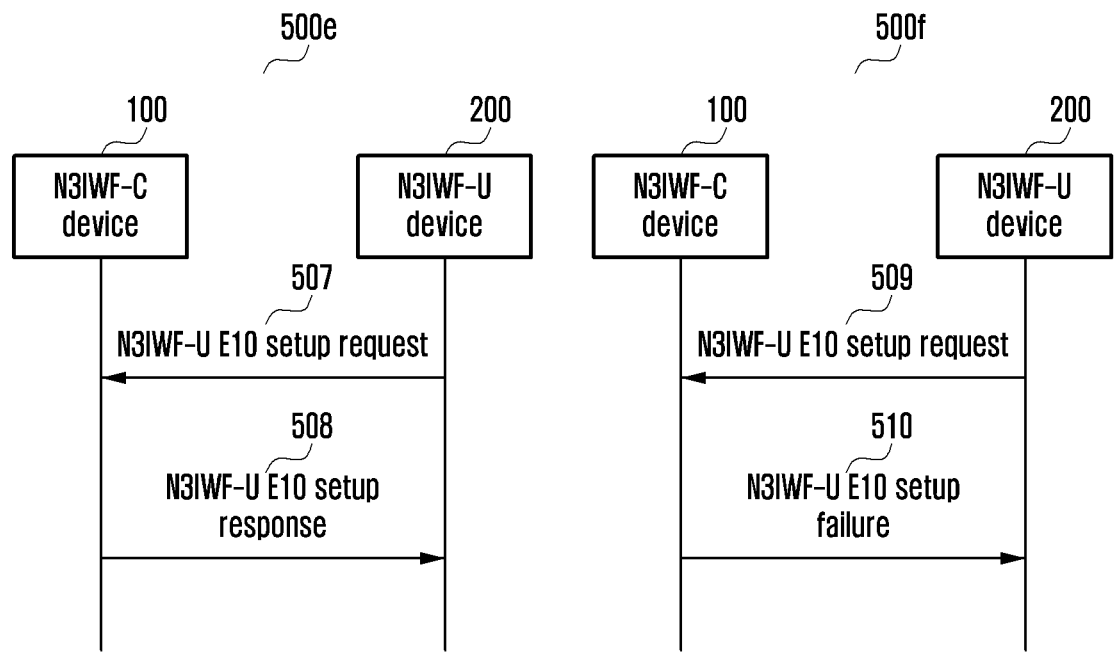
Figure 5B:
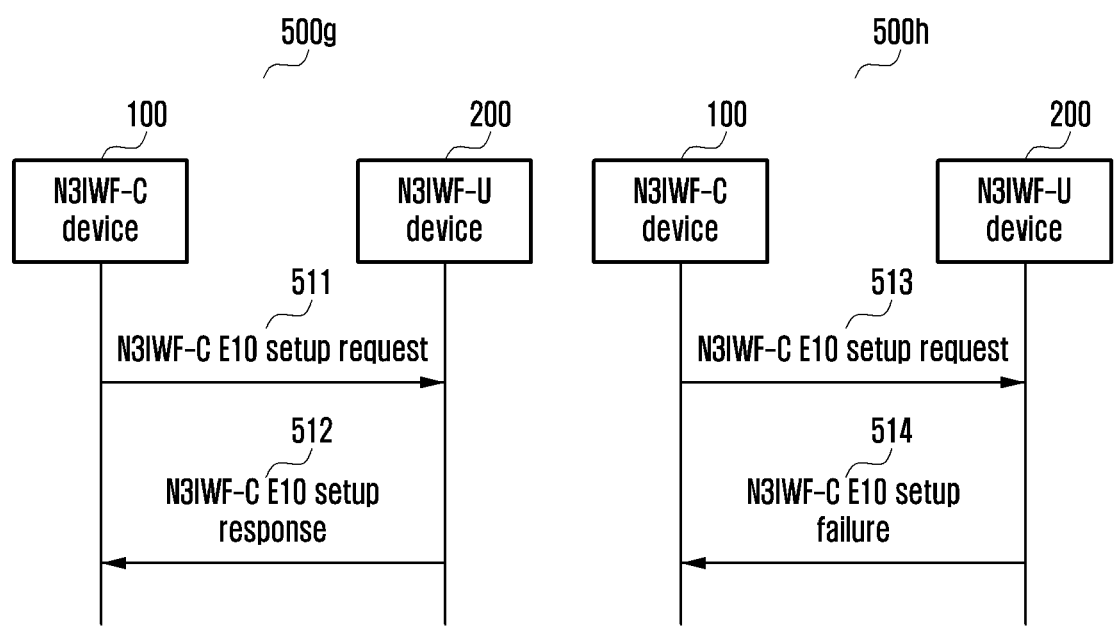

FIG. 5B illustrates the plurality of services between the N3IWF-C device (100) and the N3IWF-U device (200). The plurality of services includes the N3IWF-U E10 setup service, the N3IWF-U E10 setup response, the N3IWF-U E10 setup failure, the N3IWF-C E10 setup service, the N3IWF-C E10 setup response, and the N3IWF-C E10 setup failure.

Referring to sequence flow diagram 500e: at 507, the N3IWF-U device (200) sends the N3IWF-U E10 setup service (e.g., N3IWF-U E10 setup request) to the N3IWF-C device (100) to transfer information for a TNL association. At 508, the N3IWF-C device (100) sends the N3IWF-U E10 setup response to the N3IWF-U device (200) to transfer information for the TNL association.

Referring to sequence flow diagram 500f: at 509, the N3IWF-U device (200) sends the N3IWF-U E10 setup service (e.g., N3IWF-U E10 setup request) to the N3IWF-C device (100) to transfer information for the TNL association. At 510, the N3IWF-C device (100) sends the N3IWF-U E10 setup failure to the N3IWF-U device (200) to indicate E10 Setup failure.

In an embodiment of the disclosure, the IEs for the N3IWF-U E10 setup request are listed in the Table 4 below.

TABLE 4

| IE/Group Name | Presence | Range |
|---|---|---|
| Message Type | M | |
| Transaction ID | M | |
| N3IWF-U ID | M | |
| N3IWF-U Name | O | |
| CN Support | M | |
| Supported PLMNs | | 1 . . . <maxnoofSPLMNs> |
| >PLMN Identity | M | |
| >Slice Support List | O | |
| >Extended Slice Support List | O | |
| >QoS Parameters Support List | O | |
| N3IWF-U Capacity | O | |
| Transport Network Layer Address Info | O | |
| Extended N3IWF-U Name | O | |

Where maxnoofSPLMNs is a maximum number of supported PLMN Ids, the value is 12.

In an embodiment of the disclosure, the IEs for the N3IWF-U E10 setup response are listed in the Table 5 below.

TABLE 5

| IE/Group Name | Presence |
|---|---|
| Message Type | M |
| Transaction ID | M |
| N3IWF-C Name | O |
| Transport Network Layer Address Info | O |
| Extended N3IWF-C Name | O |

In an embodiment of the disclosure, the IEs for the N3IWF-U E10 setup failure are listed in the Table 6 below.

TABLE 6

| IE/Group Name | Presence |
|---|---|
| Message Type | M |
| Transaction ID | M |
| Cause | M |
| Time To wait | O |
| Criticality Diagnostics | O |

Referring to sequence flow diagram 500g: at 511, the N3IWF-C device (100) sends the N3IWF-C E10 setup service (e.g., N3IWF-C E10 setup request) to the N3IWF-U device (200) to transfer information for the TNL association. At 512, the N3IWF-U device (200) sends the N3IWF-CE10 setup response to the N3IWF-C device (100) to transfer information for the TNL association.

Referring to sequence flow diagram 500h: at 513, the N3IWF-C device (100) sends the N3IWF-C E10 setup service (e.g., N3IWF-C E10 setup request) to the N3IWF-U device (200) to transfer information for the TNL association. At 514, the N3IWF-U device (200) sends the N3IWF-C E10 setup failure to the N3IWF-C device (100) to indicate E10 Setup failure.

In an embodiment of the disclosure, the IEs for the N3IWF-C E10 setup request are listed in Table 7 below.

TABLE 7

| IE/Group Name | Presence |
|---|---|
| Message Type | M |
| Transaction ID | M |
| N3IWF-C Name | O |
| Transport Network Layer Address Info | O |
| Extended N3IWF-C Name | O |

In an embodiment of the disclosure, the IEs for the N3IWF-C E10 setup response are listed in Table 8 below.

TABLE 8

| IE/Group Name | Presence | Range |
|---|---|---|
| Message Type | M | |
| Transaction ID | M | |
| N3IWF-U ID | M | |
| N3IWF-U Name | O | |
| CN Support | M | |
| Supported PLMNs | | 1 ... <maxnoofSPLMNs> |
| >PLMN Identity | M | |
| >Slice Support List | O | |
| >Extended Slice Support List | O | |
| >QoS Parameters Support List | O | |
| N3IWF-U Capacity | O | |
| Transport Network Layer Address Info | O | |
| Extended N3IWF-U Name | O | |

Where MaxnoofSPLMNs is a maximum number of supported PLMN Ids, the value is 12.

In an embodiment of the disclosure, the IEs for the N3IWF-C E10 setup failure are listed in Table 9 below.

TABLE 9

| IE/Group Name | Presence |
|---|---|
| Message Type | M |
| Transaction ID | M |
| Cause | M |
| Time To wait | O |
| Criticality Diagnostics | O |

Figure 5C:
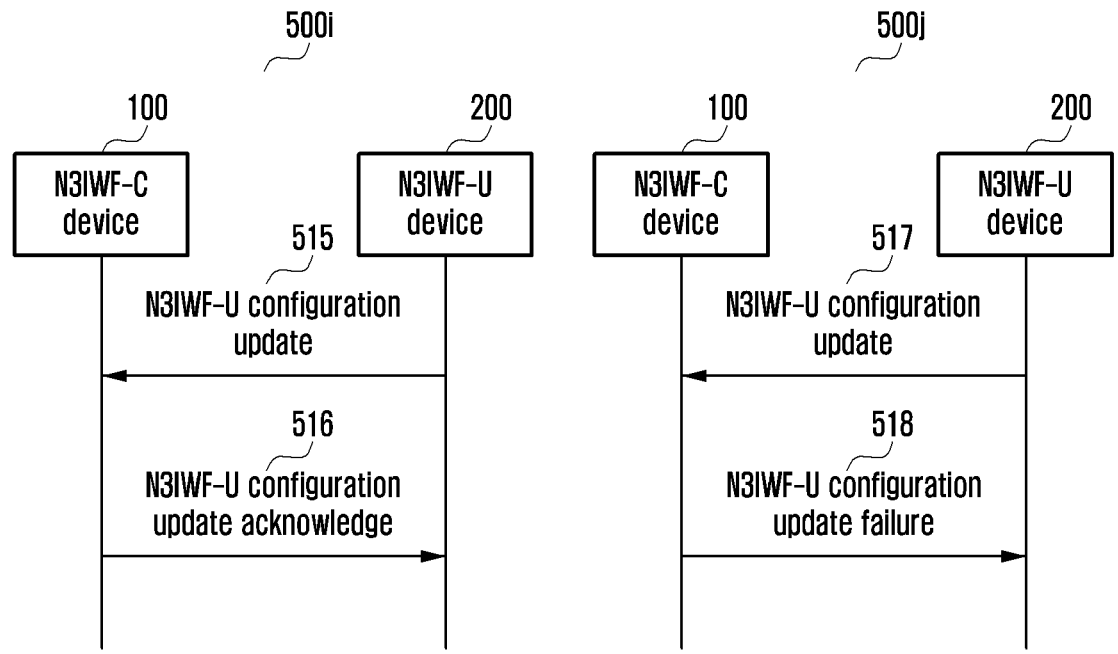
Figure 5C:
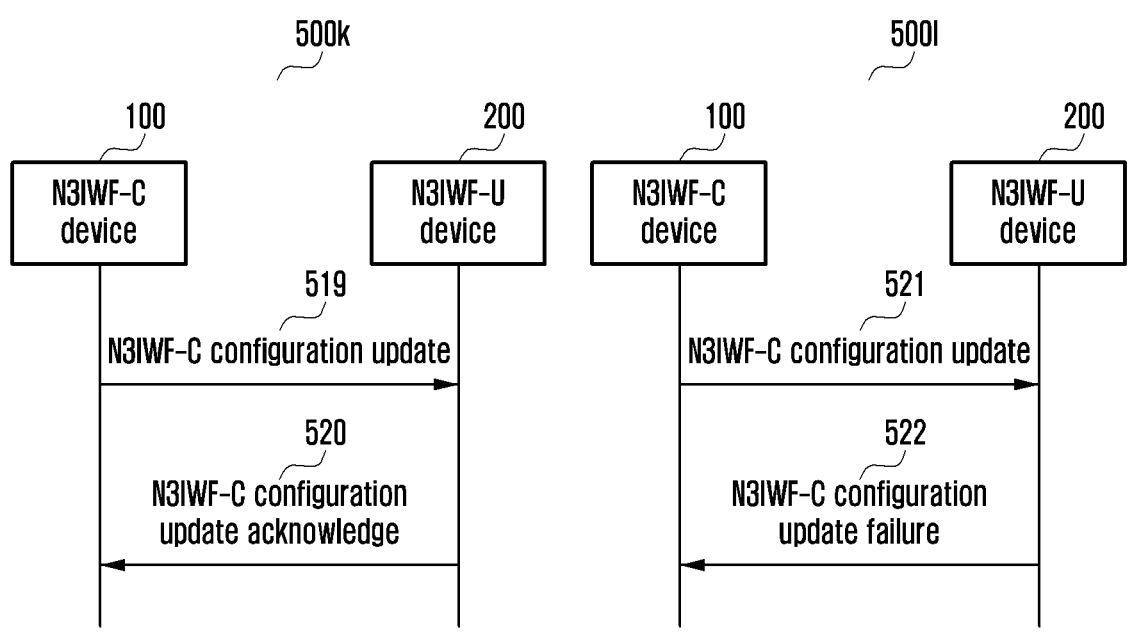

FIG. 5C illustrates the plurality of services between the N3IWF-C device (100) and the N3IWF-U device (200). The plurality of services includes the N3IWF-U configuration update service, the N3IWF-U configuration update acknowledge, the N3IWF-U configuration update failure, the N3IWF-C configuration update service, the N3IWF-C configuration update acknowledge, and the N3IWF-C configuration update failure.

Referring to sequence flow diagram 500i: at 515, the N3IWF-U device (200) sends the N3IWF-U configuration update service (e.g., the N3IWF-U configuration update message) to the N3IWF-C device (100) to transfer information for the TNL association. At 516, the N3IWF-C device (100) sends the N3IWF-U configuration acknowledge to the N3IWF-U device (200) to acknowledge update of information for the TNL association.

Referring to sequence flow diagram 500j: at 517, the N3IWF-U device (200) sends the N3IWF-U configuration update service (e.g., the N3IWF-U configuration update message) to the N3IWF-C device (100) to transfer information for the TNL association. At 518, the N3IWF-C device (100) sends the N3IWF-U configuration update failure to the N3IWF-U device (200) to indicate N3IWF-U configuration update failure.

In an embodiment of the disclosure, the IEs for the N3IWF-U configuration update service are listed in Table 10 below.

TABLE 10

| IE/Group Name | Presence | Range |
|---|---|---|
| Message Type | M | |
| Transaction ID | M | |
| N3IWF-U ID | O | |
| N3IWF-U Name | O | |
| Supported PLMNs | | 0 . . . <maxnoofSPLMNs> |
| >PLMN Identity | M | |
| >Slice Support List | O | |
| >Extended Slice Support List | O | |
| >QoS Parameters Support List | O | |
| N3IWF-U Capacity | O | |
| N3IWF-U TNLA To Remove List | | 0 . . . 1 |
| >N3IWF-U TNLA To Remove Item IEs | | 1 . . . <maxnoofTNLAssociations> |
| >>TNLA Transport Layer Address | M | |
| >>TNLA Transport Layer Address N3IWF-C | O | |
| Transport Network Layer Address Info | O | |
| Extended N3IWF-U Name | O | |

Where the maxnoofSPLMNs is maximum number of supported PLMN Ids, value is 12. The maxnoofTNLAssociations is maximum number of TNL associations between the N3IWF-U device (200) and the N3IWF-C device (100), value is 32.

In an embodiment of the disclosure, the IEs for the N3IWF-U configuration acknowledge are listed in Table 11 below.

TABLE 11

| IE/Group Name | Presence |
|---|---|
| Message Type | M |
| Transaction ID | M |
| Criticality Diagnostics | O |
| Transport Network Layer Address Info | O |

In an embodiment of the disclosure, the IEs for the N3IWF-U configuration update failure are listed in Table 12 below.

TABLE 12

| IE/Group Name | Presence |
|---|---|
| Message Type | M |
| Transaction ID | M |
| Cause | M |
| Time To wait | O |
| Criticality Diagnostics | O |

Referring to sequence flow diagram 500k: at 519, the N3IWF-C device (100) sends the N3IWF-C configuration update service (e.g., the N3IWF-C configuration update message) to the N3IWF-U device (200) to transfer information for the TNL association. At 520, the N3IWF-U device (200) sends the N3IWF-C configuration acknowledge to the N3IWF-C device (100) to acknowledge update of information for the TNL association.

Referring to sequence flow diagram 500l: at 521, the N3IWF-C device (100) sends the N3IWF-C configuration update service (e.g., the N3IWF-C configuration update message) to the N3IWF-U device (200) to transfer information for the TNL association. At 522, the N3IWF-U device (200) sends the N3IWF-C configuration update failure to the N3IWF-C device (100) to indicate N3IWF-C configuration update failure.

In an embodiment of the disclosure, the IEs for the N3IWF-C configuration update service are listed in Table 13 below.

TABLE 13

| IE/Group Name | Presence | Range |
|---|---|---|
| Message Type | M | |
| Transaction ID | M | |
| N3IWF-C Name | O | |
| N3IWF-C TNLA To Add List | | 0 . . . 1 |
| >N3IWF-C TNLA To Add Item IEs | | 1 . . . <maxnoofTNLAssociations> |
| >>TNLA Transport Layer Information | M | |
| >>TNLA Usage | M | |
| N3IWF-C TNLA To Remove List | | 0 . . . 1 |
| >N3IWF-C TNLA To Remove Item IEs | | 1 . . . <maxnoofTNLAssociations> |
| >>TNLA Transport Layer Address | M | |
| >>TNLA Transport Layer Address N3IWF-U | O | |
| N3IWF-C TNLA To Update List | | 0 . . . 1 |
| >N3IWF-C TNLA To Update Item IEs | | 1 . . . <maxnoofTNLAssociations> |
| >>TNLA Transport Layer Address | M | |
| >>TNLA Usage | O | |
| Transport Network Layer Address Info | O | |
| Extended N3IWF-C Name | O | |

Where the MaxnoofTNLAssociations is maximum numbers of TNL associations between the N3IWF-C device (100) and the N3IWF-U device (200), value is 32.

In an embodiment of the disclosure, the IEs for the N3IWF-C configuration update acknowledgement are listed in Table 14 below.

TABLE 14

| IE/Group Name | Presence | Range |
|---|---|---|
| Message Type | M | |
| Transaction ID | M | |
| N3IWF-C TNLA Setup List | | 0 . . . 1 |
| >N3IWF-C TNLA Setup Item IEs | | 1 . . . <maxnoofTNLAssociations> |
| >>TNLA Transport Layer Address | M | |
| N3IWF-C TNLA Failed to Setup List | | 0 . . . 1 |
| >N3IWF-C TNLA Failed To Setup Item IEs | | 1 . . . <maxnoofTNLAssociations> |
| >>TNLA Transport Layer Address | M | |
| >>Cause | M | |
| Criticality Diagnostics | O | |
| Transport Network Layer Address Info | O | |

Where the MaxnoofTNLAssociations is maximum numbers of TNL associations between the N3IWF-C device (100) and the N3IWF-U device (200), value is 32.

In an embodiment of the disclosure, the IEs for the N3IWF-C configuration update failure are listed in Table 15 below.

TABLE 15

| IE/Group Name | Presence |
|---|---|
| Message Type | M |
| Transaction ID | M |
| Cause | M |
| Time To wait | O |
| Criticality Diagnostics | O |

Figure 5D:
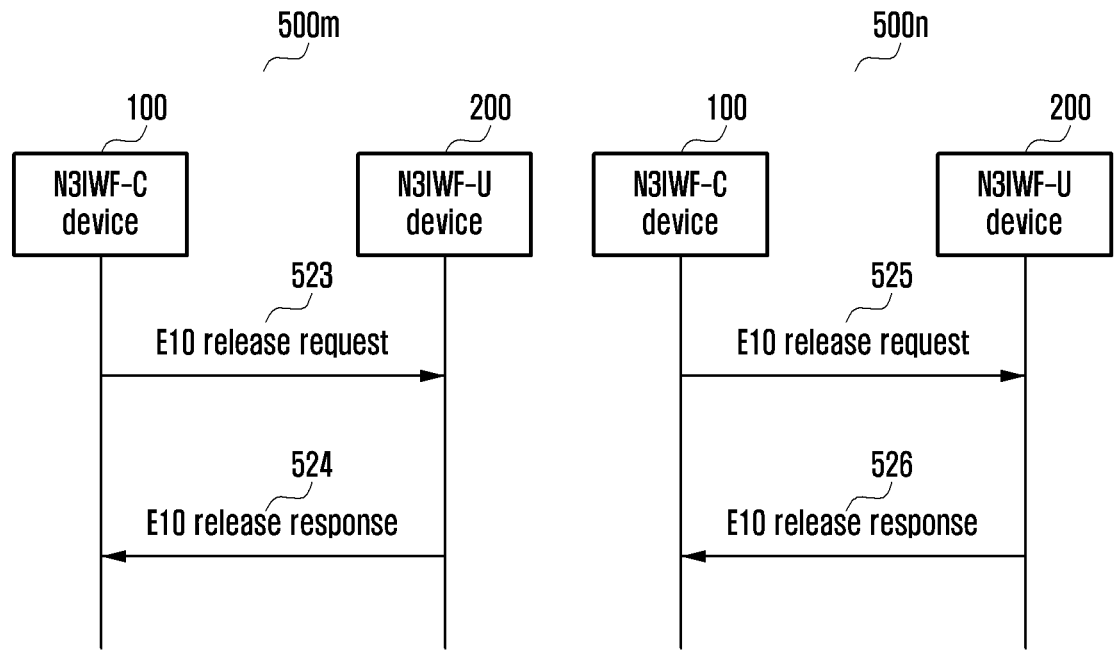
Figure 5D:
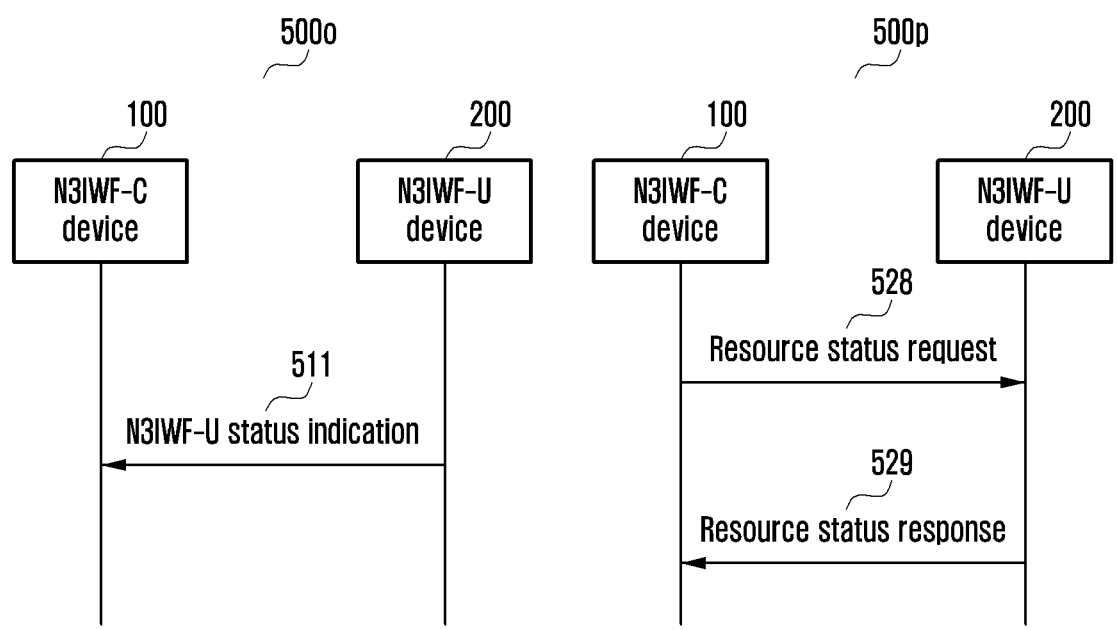
Figure 5E:
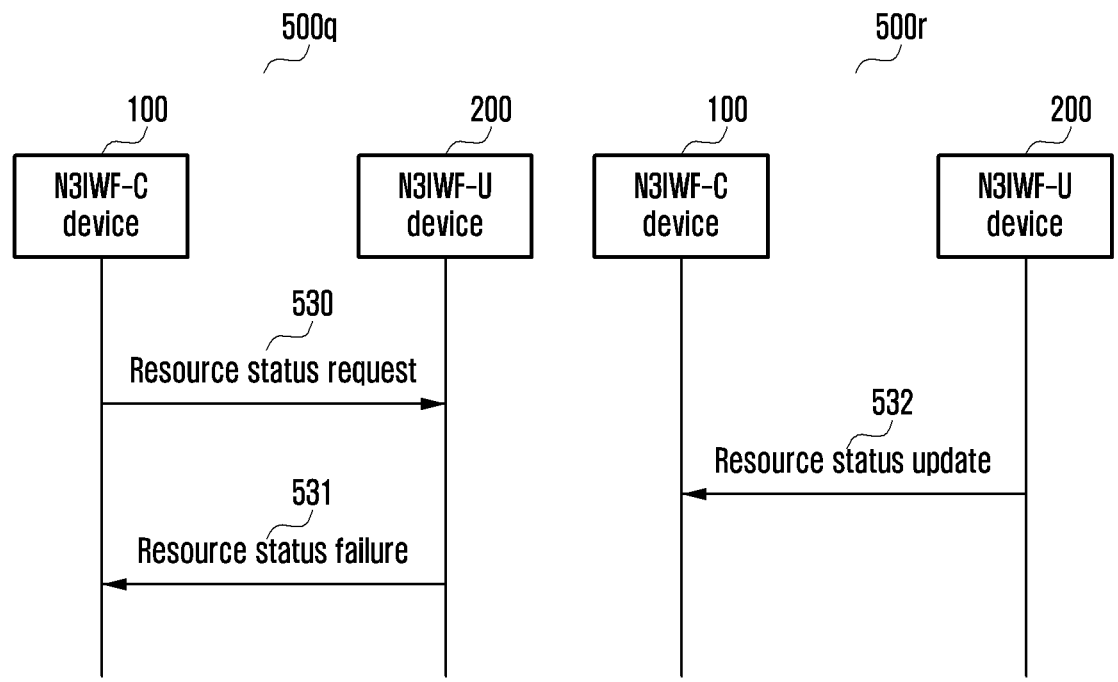
Figure 5E:
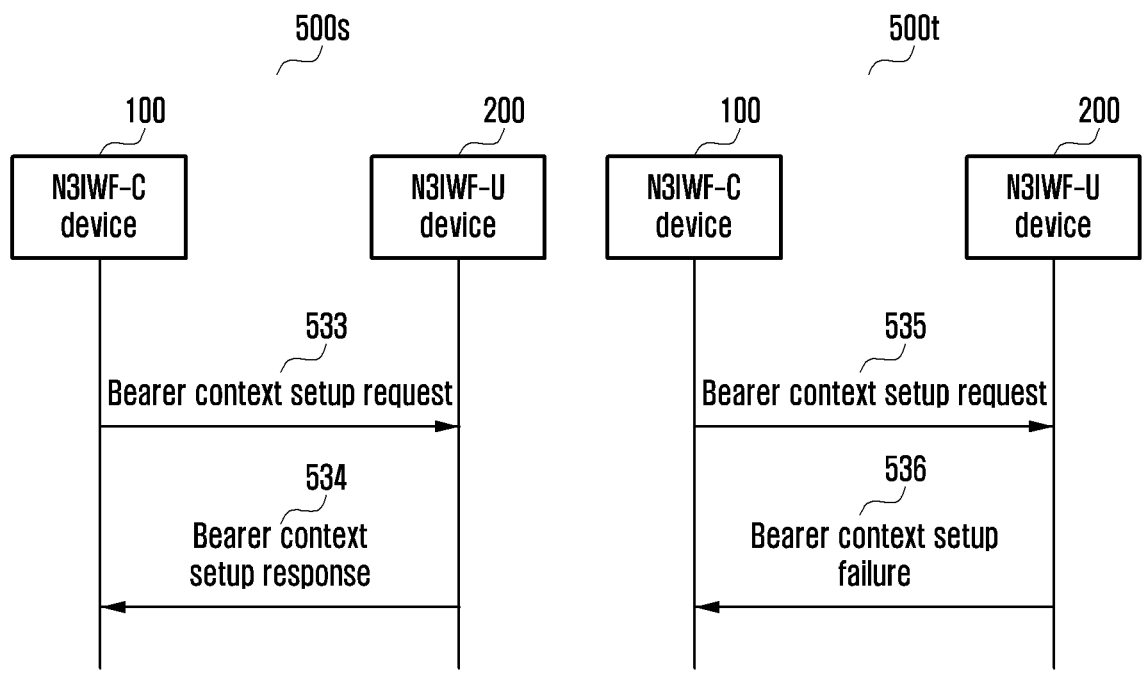

FIGS. 5D and 5E illustrate the plurality of services between the N3IWF-C device (100) and the N3IWF-U device (200). The plurality of services includes the E10 release service (e.g., E10 release request, E10 release response, or the like), the N3IWF-U status indication service (e.g., resource status request, resource status response, resource status failure, resource status update), and the bearer context setup service (e.g., bearer context setup request, bearer context setup response, bearer context setup failure, or the like).

Referring to sequence flow diagram 500*m*: at 523, the N3IWF-C device (100) sends the E10 release request to the N3IWF-U device (200) to request the release of the E10 interface. At 524, the N3IWF-U device (200) sends the E10 release response to the N3IWF-C device (100) as a response to the E10 release request message.

Referring to sequence flow diagram 500*n*: at 525, the N3IWF-U device (200) sends the E10 release request to the N3IWF-C device (100) to request the release of the E10 interface. At 526, the N3IWF-C device (100) sends the E10 release response to the N3IWF-U device (200) as a response to the E10 release request message.

In an embodiment of the disclosure, the IEs for the E10 release request are listed in Table 16 below.

TABLE 16

| IE/Group Name | Presence |
|---|---|
| Message Type | M |
| Transaction ID | M |
| Cause | M |

In an embodiment of the disclosure, the IEs for E10 release response are listed in Table 17 below.

TABLE 17

| IE/Group Name | Presence |
|---|---|
| Message Type | M |
| Transaction ID | M |

Referring to sequence flow diagram 500o: at 527, the N3IWF-U device (200) sends the N3IWF-U status indication to the N3IWF-C device (100) to indicate to the N3IWF-C device (100) its status of overload.

In an embodiment of the disclosure, the IEs for the N3IWF-U status indication are listed in Table 18 below.

TABLE 18

| IE/Group Name | Presence |
|---|---|
| Message Type | M |
| Transaction ID | M |
| N3IWF-U overload information | M |

Referring to sequence flow diagram 500p: at 528, the N3IWF-C device (100) sends the resource status request to the N3IWF-U device (200) to initiate the requested measurement according to the parameters given in the message. At 529, the N3IWF-U device (200) sends the resource status response to the N3IWF-C device (100) to indicate that the requested measurement, for all the measurement objects included in the measurement is successfully initiated.

Referring to sequence flow diagram 500q: at 530, the N3IWF-C device (100) sends the resource status request to the N3IWF-U device (200) to initiate the requested measurement according to the parameters given in the message. At 531, the N3IWF-U device (200) sends the resource status failure to the N3IWF-C device (100) to indicate that for any of the requested measurement objects the measurement cannot be initiated.

Referring to sequence flow diagram 500r: at 532, the N3IWF-U device (200) sends the resource status update to the N3IWF-C device (100) to report the results of the requested measurements.

In an embodiment of the disclosure, the IEs for the resource status request are listed in Tables 19 and 20 below.

TABLE 19

| IE/Group Name | Presence |
|---|---|
| Message Type | M |
| Transaction ID | M |
| N3IWF-C Measurement ID | M |
| N3IWF-U Measurement ID | C-ifRegistrationRequestStop |
| Registration Request | M |
| Report Characteristics | C-ifRegistrationRequestStart |
| Reporting Periodicity | O |

TABLE 20

| Condition | Explanation |
|---|---|
| ifRegistrationRequestStop | This IE shall be present if the Registration Request IE is set to the value "stop" |
| ifRegistrationRequestStart | This IE shall be present if the Registration Request IE is set to the value "start". |

In an embodiment of the disclosure, the IEs for the resource status response are listed in Table 21 below.

TABLE 21

| IE/Group Name | Presence |
|---|---|
| Message Type | M |
| Transaction ID | M |
| N3IWF-C Measurement ID | M |

TABLE 21-continued

| IE/Group Name | Presence |
|---|---|
| N3IWF-U Measurement ID | M |
| Criticality Diagnostics | O |

In an embodiment of the disclosure, the IEs for the resource status failure are listed in Tables 22 and 23 below.

TABLE 22

| IE/Group Name | Presence |
|---|---|
| Message Type | M |
| Transaction ID | M |
| N3IWF-C Measurement ID | M |
| N3IWF-U Measurement ID | C-ifRegistrationRequestStop |
| Cause | M |
| Criticality Diagnostics | O |

TABLE 23

| Condition | Explanation |
|---|---|
| ifRegistrationRequestStop | This IE shall be present if the Registration Request IE is set to the value "stop" |

In an embodiment of the disclosure, the IEs for the resource status update are listed in Tables 24 and 25 below.

TABLE 24

| IE/Group Name | Presence |
|---|---|
| Message Type | M |
| Transaction ID | M |
| N3IWF-C Measurement ID | M |
| N3IWF-U Measurement ID | M |
| TNL Available Capacity Indicator | O |
| HW Capacity Indicator | O |

TABLE 25

| Range bound | Explanation |
|---|---|
| maxnoofSPLMNs | Maximum no. of Supported PLMN Ids. Value is 12. |
| maxnoofSliceitems | Maximum no. of signalled slice support items. Value is 1024. |

Referring to sequence flow diagram 500s: at 533, the N3IWF-C device (100) sends the bearer context setup request to the N3IWF-U device (200) to setup a bearer context. At 534, the N3IWF-U device (200) sends the bearer context setup response to the N3IWF-C device (100) to confirm the setup of the requested bearer context.

Referring to sequence flow diagram 500t: at 535, the N3IWF-C device (100) sends the bearer context setup request to the N3IWF-U device (200) to setup the bearer context. At 536, the N3IWF-U device (200) sends the bearer context setup failure to indicate that the setup of the bearer context was unsuccessful.

In an embodiment of the disclosure, the IEs for the bearer context setup request are listed in Table 26 below.

TABLE 26

| IE/Group Name | Presence |
| --- | --- |
| Message Type | M |
| N3IWF-C UE E10AP ID | M |
| Security Information | M |
| Serving PL MN | M |
| Activity Notification Level | M |
| UE Inactivity Timer | O |
| Bearer Context Status Change | O |
| N3IWF | |
| >PDU Session Resource To Setup List | M |
| >>PDU Session Resource To Setup Item | M |
| >>>PDU Session ID | M |
| >>>NG UL UP Transport Layer Information | M |
| >>>SPI To Setup List | M |
| >>>>SPI To Setup Item | M |
| >>>>>SPI | M |
| >>>>>SA payload | M |
| >>>>>QFIs | M |
| ... | |
| N3IWF UE ID | O |
| Trace Activation | O |

In an embodiment of the disclosure, the IEs for the bearer context setup response are listed in Table 27 below.

TABLE 27

| Message Type | Presence |
| --- | --- |
| N3IWF-C UE E10AP ID | M |
| N3IWF-U UE E10AP ID | M |
| N3IWF | M |
| >PDU Session Resource Setup List | M |
| >>PDU Session Resource Setup Item | M |
| >>>PDU Session ID | M |
| >>>NG DL UP Transport Layer Information | M |
| >>>SPI Setup List | M |
| >>>>SPI Setup Item | M |
| >>>>>SPI | M |
| >>>SPI Failed List | O |
| >>>>SPI Failed Item | M |
| >>>>>SPI | M |
| ... | |
| >PDU Session Resource Failed List | O |
| >>PDU Session Resource Failed Item | M |
| >>>PDU Session ID | M |
| >>>Cause | M |

In an embodiment of the disclosure, the IEs for the bearer context setup failure are listed in Table 28 below.

TABLE 28

| IE/Group Name | Presence |
| --- | --- |
| Message Type | M |
| N3IWF-C UE E10AP ID | M |
| N3IWF-U UE E10AP ID | O |
| Cause | M |
| Criticality Diagnostics | O |

Figure 5F:
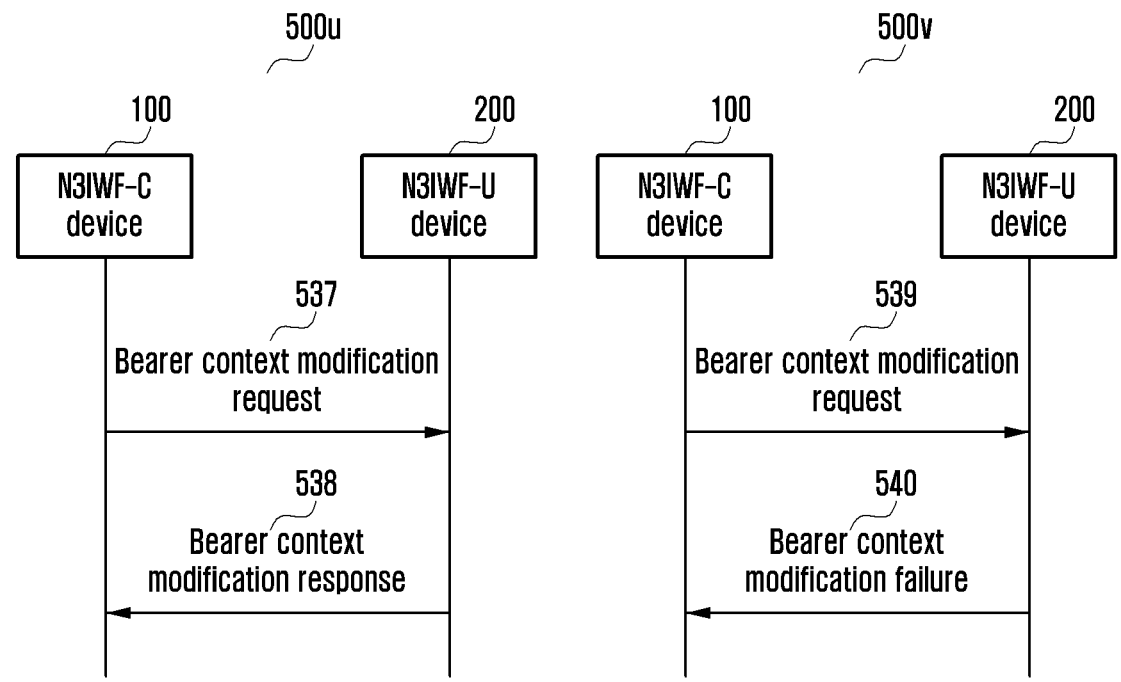
Figure 5F:
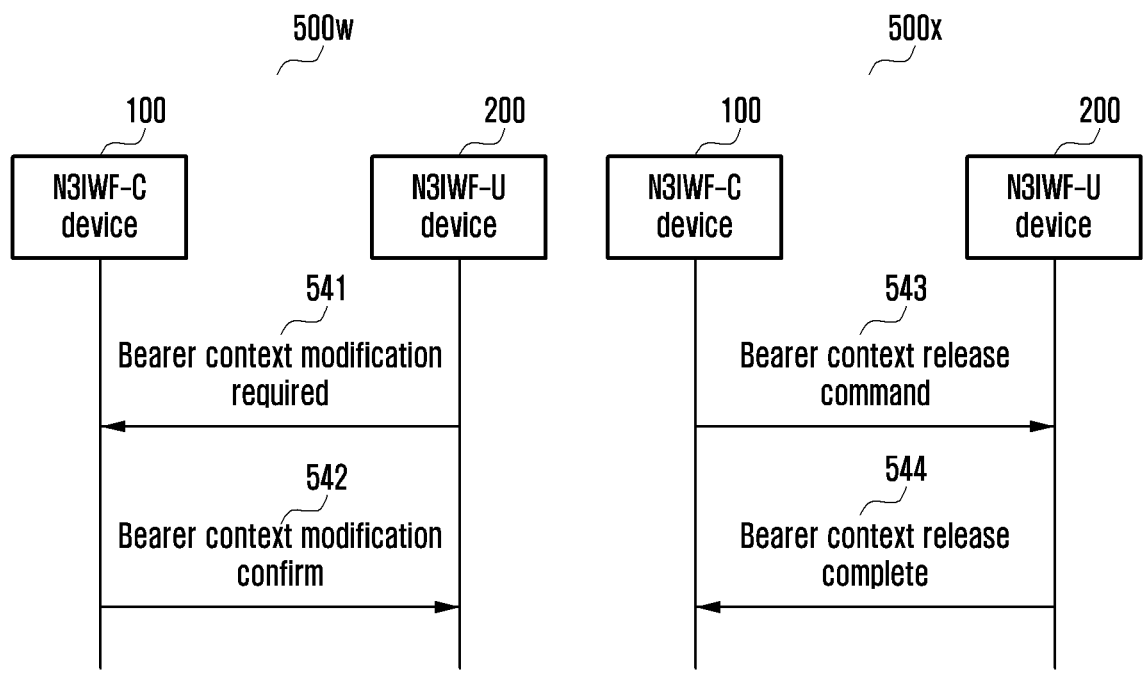

FIG. 5F illustrates the plurality of services between the N3IWF-C device (100) and the N3IWF-U device (200). The plurality of services includes the bearer context setup service (e.g., bearer context modification request, bearer context modification response, bearer context modification failure, bearer context modification required, bearer context modification confirm, bearer context release command, bearer context release complete, or the like).

Referring to sequence flow diagram 500u: at 537, the N3IWF-C device (100) sends the bearer context modification request to the N3IWF-U device (200) to modify the bearer context. At 538, the N3IWF-U device (200) sends the bearer context modification response to the N3IWF-C device (100) to confirm the modification of the requested bearer context.

Referring to sequence flow diagram 500v: at 539, the N3IWF-C device (100) sends the bearer context modification request to the N3IWF-U device (200) to modify the bearer context. At 540, the N3IWF-U device (200) sends the bearer context modification failure to the N3IWF-C device (100) to indicate that the modification of the bearer context was unsuccessful.

Referring to sequence flow diagram 500w: at 541, the N3IWF-U device (200) sends the bearer context modification required to the N3IWF-C device (100) to inform the N3IWF-C device (100) that a modification of the bearer context is required (e.g., due to local problems at the N3IWF-U device (200)). At 542, the N3IWF-C device (100) sends the bearer context modification confirm to the N3IWF-U device (200) to confirm the modification of the requested bearer context.

Referring to sequence flow diagram 500x: at 543, the N3IWF-C device (100) sends the bearer context command to command the N3IWF-U device (200) to release the UE-associated logical E10 connection. At 544, the N3IWF-U device (200) sends the bearer context release complete to confirm the release of the UE-associated logical E10 connection.

In an embodiment of the disclosure, the IEs for the bearer context modification request are listed in Tables 29 and 30 below.

TABLE 29

| IE/Group Name | Presence |
| --- | --- |
| Message Type | M |
| N3IWF-C UE E10AP ID | M |
| N3IWF-U UE E10AP ID | M |
| Security Information | O |
| UE DL Aggregate Maximum Bit Rate | O |
| UE DL Maximum Integrity Protected Data Rate | O |
| Bearer Context Status Change | O |
| New UL TNL Information Required | O |
| UE Inactivity Timer | O |
| Data Discard Required | O |
| N3IWF | |
| >PDU Session Resource To Setup List | O |
| >>PDU Session Resource To Setup Item | M |
| >>>PDU Session ID | M |
| >>>NG UL UP Transport Layer Information | M |
| >>>SPI To Setup List | M |
| >>>>SPI To Setup Item | M |
| >>>>>SPI | M |
| >>>>>SA payload | M |
| >>>>>QFIs | M |

TABLE 30

| IE/Group Name | Presence |
| --- | --- |
| >PDU Session Resource To Modify List | O |
| >>PDU Session Resource To Modify Item | M |
| >>>PDU Session ID | M |
| >>>NG UL UP Transport Layer Information | M |
| >>>SPI To Setup List | M |
| >>>SPI To Modify List | M |
| >>>SPI To Remove List | M |
| >PDU Session Resource To Remove List | O |
| >>PDU Session Resource To Remove Item | |
| >>>PDU Session ID | M |
| >>>Cause | O |

TABLE 30-continued

| IE/Group Name | Presence |
|---|---|
| N3IWF UE ID | O |
| Activity Notification Level | O |

The security parameter Index (SPI) is an identification tag added to the header while using IPsec for tunnelling the IP traffic. This tag helps to discern between two traffic streams where different encryption rules and algorithms may be in use. The SPI (as per RFC 2401) is a required part of an IPsec security association (SA) because it enables the receiving system to select the SA under which a received packet will be processed.

In an embodiment of the disclosure, the IEs for the bearer context modification response are listed in Tables 31 to 38 below.

TABLE 31

| IE/Group Name | Presence |
|---|---|
| Message Type | M |
| N3IWF-C UE E1OAP ID | M |
| N3IWF-U UE E1OAP ID | M |
| N3IWF | |
| >PDU Session Resource Setup List | O |
| >PDU Session Resource Failed List | O |
| >PDU Session Resource Modified List | O |
| >PDU Session Resource Failed To Modify List | O |
| >Retainability Measurements Information | O |

Where the PDU session resource failed List IE:

TABLE 32

| IE/Group Name | Presence | Range |
|---|---|---|
| PDU Session Resource Failed Modification Item | | 1 . . . <maxnoofPDUSessionResource> |
| >PDU Session ID | M | |
| >Cause | M | |

Where the PDU Session Resource Setup List IE:

TABLE 33

| IE/Group Name | Presence | Range |
|---|---|---|
| PDU Session Resource Setup Modification Item | | 1 . . . <maxnoofPDUSessionResource> |
| >PDU Session ID | M | |
| >Security Result | O | |
| >NG DL UP Transport Layer Information | M | |
| >SPI Setup List | | 1 |
| >>SPI Setup Item | | 1 . . . <maxnoofSPIs> |
| >>>SPI | M | |
| >>>QFIs | M | |
| >SPI Failed List | | 0 . . . 1 |
| >>SPI Failed Item | | 1 . . . <maxnoofSPIs> |
| >>>SPI | M | |
| >>>Cause | M | |
| >Redundant NG DL UP Transport Layer Information | O | |

TABLE 34

| Range bound | Explanation |
|---|---|
| maxnoofPDUSessionResource | Maximum no. of PDU Sessions for a UE. Value is 256. |

TABLE 35

| Range bound | Explanation |
|---|---|
| maxnoofSPIs | Maximum no. of SPIs for a UE. Value is 64. |

Where the PDU Session Resource Modified List IE:

TABLE 36

| IE/Group Name | Presence | Range |
|---|---|---|
| PDU Session Resource Modified Item | | 1 ... <maxnoofSPISessionResource> |
| >PDU Session ID | M | |
| >NG DL UP Transport Layer Information | O | |
| >Security Result | O | |
| >PDU Session Data Forwarding Information Response | O | |
| >SPI Setup List | | 0 ... 1 |
| >>SPI Setup Item | | 1 ... <maxnoofSPIs> |
| >>>SPI | M | |
| >>>QFIs | M | |
| >SPI Modified List | | 0 ... 1 |
| >>SPI Modified Item | | 1 ... <maxnoofSPIs> |
| >>>SPI | M | |
| >>>QFIs | M | |
| >SPI Failed To Modify List | | 0 ... 1 |
| >>SPI Failed To Modify Item | | 1 ... <maxnoofSPIs> |
| >>>SPI | M | |
| >>>Cause | M | |
| >Redundant NG DL UP Transport Layer Information | O | |

Where PDU session resource failed to modify List IE:

TABLE 37

| IE/Group Name | Presence | Range |
|---|---|---|
| PDU Session Resource Failed To Modify Item | | 1 ... <maxnoofPDUSessionResource> |
| >PDU Session ID | M | |
| >Cause | M | |

TABLE 38

| Range bound | Explanation |
|---|---|
| maxnoofSPIs | Maximum no. of SPI for a UE, the maximum value is 64. |
| maxnoofPDUSessionResource | Maximum no. of PDU Sessions for a UE. Value is 256. |

In an embodiment of the disclosure, the IEs for the bearer context modification failure are listed in Table 39 below.

TABLE 39

| IE/Group Name | Presence |
|---|---|
| Message Type | M |
| N3IWF-C UE E10AP ID | M |
| N3IWF-U UE E10AP ID | M |
| Cause | M |
| Criticality Diagnostics | O |

In an embodiment of the disclosure, the IEs for the bearer context modification required are listed in Tables 40 to 44 below.

TABLE 40

| IE/Group Name | Presence |
|---|---|
| Message Type | M |
| N3IWF-C UE E10AP ID | M |

TABLE 40-continued

| IE/Group Name | Presence |
|---|---|
| N3IWF-U UE E10AP ID N3IWF | M |

TABLE 40-continued

| IE/Group Name | Presence |
|---|---|
| >PDU Session Resource To Modify List | O |
| >PDU Session Resource To Remove List | O |

TABLE 41

| Range bound | Explanation |
|---|---|
| maxnoofPDUSessionResource | Maximum no. of PDU Sessions for a UE. Value is 256. |

Where PDU Session Resource to Modify List IE:

TABLE 42

| IE/Group Name | Presence | Range |
|---|---|---|
| PDU Session Resource Required To Modify Item | | 1 ... <maxnoofPDUSessionResource> |
| >PDU Session ID | M | |
| >NG DL UP Transport Layer Information | O | |
| >SPI To Modify List | | 0 ... 1 |
| >>SPI To Modify Item | | 1 ... <maxnoofSPIs> |
| >>>SPI | M | |
| >>>SA payload | M | |
| >>>QFIs | O | |
| >>>Cause | O | |
| >SPI To Remove List | | 0 ... 1 |
| >>SPI To Remove Item | | 1 ... <maxnoofSPIs> |
| >>>SPI | M | |
| >>>Cause | M | |
| >Redundant NG DL UP Transport Layer Information | O | |

TABLE 43

| Range bound | Explanation |
|---|---|
| maxnoofSPIs | Maximum no. of SPIs for a UE. Value is 64. |

Where PDU session resource to remove List IE:

TABLE 44

| IE/Group Name | Presence | Range |
|---|---|---|
| PDU Session Resource To Remove Item | | 1 ... <maxnoofPDUSessionResource> |
| >PDU Session ID | M | |
| >Cause | O | |

In an embodiment of the disclosure, the IEs for the bearer context modification confirmed are listed in Table 45 below.

TABLE 45

| IE/Group Name | Presence |
|---|---|
| Message Type | M |
| N3IWF-C UE E10AP ID | M |
| N3IWF-U UE E10AP ID N3IWF | M |
| >PDU Session Resource Modified List | O |

In an embodiment of the disclosure, the IEs for the bearer context release command are listed in Table 46 below.

TABLE 46

| IE/Group Name | Presence |
|---|---|
| Message Type | M |
| N3IWF-C UE E10AP ID | M |
| N3IWF-U UE E10AP ID | M |
| Cause | M |

In an embodiment of the disclosure, the IEs for the bearer context release complete are listed in Table 47 below.

TABLE 47

| IE/Group Name | Presence |
|---|---|
| Message Type | M |
| N3IWF-C UE E10AP ID | M |
| N3IWF-U UE E10AP ID | M |

TABLE 47-continued

| IE/Group Name | Presence |
|---|---|
| Criticality Diagnostics | O |
| Retainability Measurements Information | O |

Figure 5G:
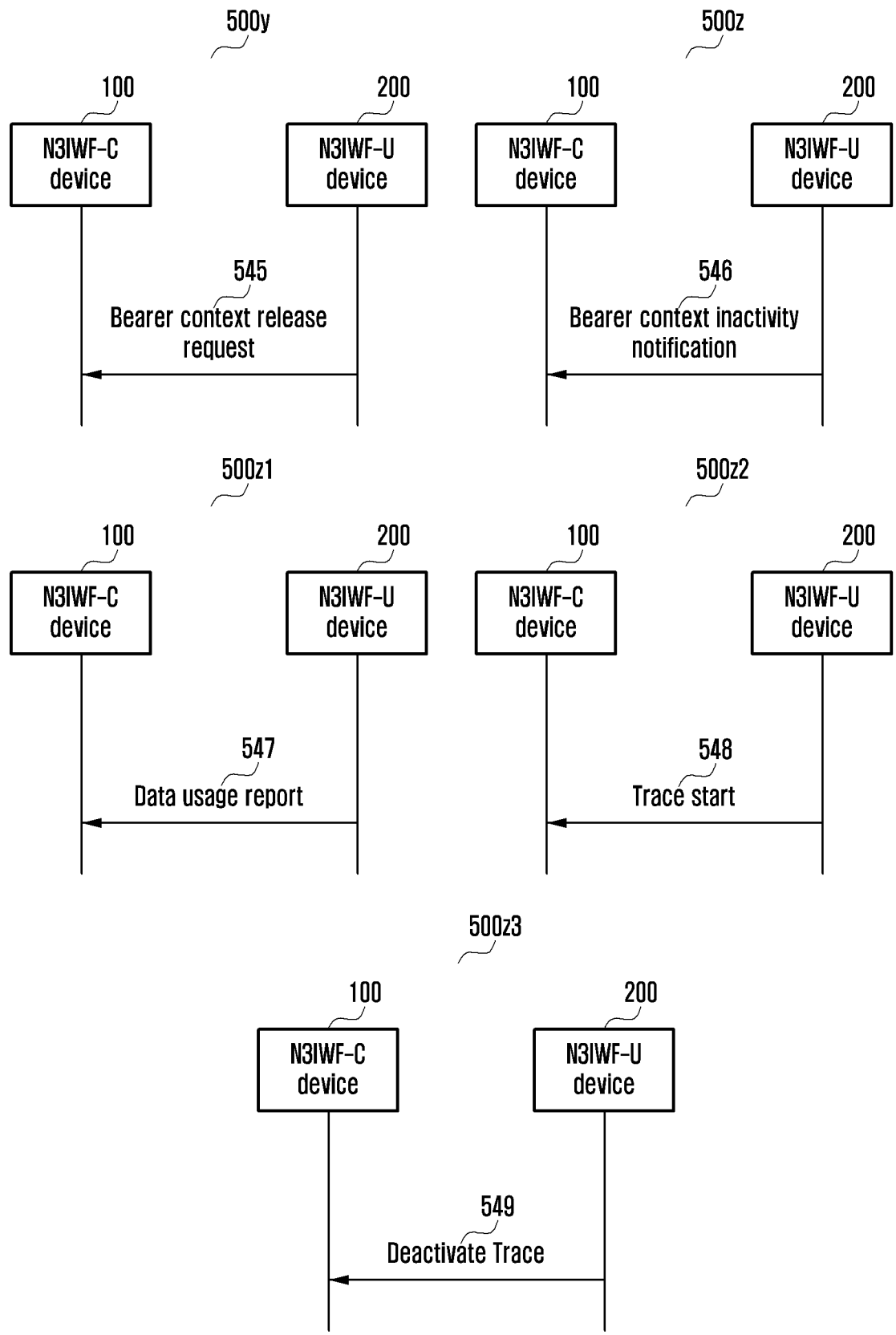

FIG. 5G illustrates the plurality of services between the N3IWF-C device (100) and the N3IWF-U device (200). The plurality of services includes the bearer context release request, the bearer context inactivity notification service, the data usage report service, the trace start service and the deactivate trace service.

Referring to sequence flow diagram 500y: at 545, the N3IWF-U device (100) sends the bearer context release request to the N3IWF-C device (100) to release of the UE-associated logical E10 connection.

In an embodiment of the disclosure, the IEs for the bearer context release request are listed in Tables 48 and 49 below.

TABLE 48

| IE/Group Name | Presence | Range |
|---|---|---|
| Message Type | M | |
| N3IWF-C UE E10AP ID | M | |
| N3IWF-U UE E10AP ID | M | |
| SPI Status List | | 0 ... 1 |
| >SPI Status Item | | 1 ... <maxnoofSPIs> |
| >>SPI | M | |
| Cause | M | |

TABLE 49

| Range bound | Explanation |
| --- | --- |
| maxnoofSPIs | Maximum no. of SPIs for a UE. Value is 64. |

Referring to sequence flow diagram 500z: at 546, the N3IWF-U device (100) sends the bearer context inactivity notification service to the N3IWF-C device (100) to provide information about the UE activity to the N3IWF-C device (100).

In an embodiment of the disclosure, the IEs for the bearer context inactivity notification service are listed in Table 50 below.

TABLE 50

| IE/Group Name | Presence | Range |
| --- | --- | --- |
| Message Type | M | |
| N3IWF-C UE E10AP ID | M | |
| N3IWF-U UE E10AP ID | M | |
| CHOICE Activity Information | M | |
| >SPI Activity List | | 1 |
| >>SPI Activity Item | | 1 . . . <maxnoofSPIs> |
| >>>SPI | M | |
| >>>SPI Activity | M | |
| >PDU Session Resource Activity List | | 1 |
| >>PDU Session Resource Activity Item | | 1 . . . <maxnoofPDUSessionResource> |
| >>>PDU Session ID | M | |
| >>>PDU Session Resource Activity | M | |
| >UE Activity | M | |

Referring to sequence flow diagram 500z1: at 547, the N3IWF-U device (100) sends the data usage report service to the N3IWF-C device (100) to report data volumes.

In an embodiment of the disclosure, the IEs for the data usage report service are listed in Table 51 below.

TABLE 51

| IE/Group Name | Presence |
| --- | --- |
| Message Type | M |
| N3IWF-C UE E10AP ID | M |
| N3IWF-U UE E10AP ID | M |
| Data Usage Report List | M |

Referring to sequence flow diagram 500z2: at 548, the N3IWF-U device (100) sends the trace start service to the N3IWF-C device (100) to initiate a trace session for the UE.

In an embodiment of the disclosure, the IEs for the trace start service are listed in Table 52 below.

TABLE 52

| IE/Group Name | Presence |
| --- | --- |
| Message Type | M |
| N3IWF-C UE E10AP ID | M |
| N3IWF-U UE E10AP ID | M |
| Trace Activation | M |

Referring to sequence flow diagram 500z3: at 549, the N3IWF-U device (100) sends the deactivate trace service to the N3IWF-C device (100) to deactivate a trace session.

In an embodiment of the disclosure, the IEs for the deactivate trace service are listed in Table 53 below.

TABLE 53

| IE/Group Name | Presence |
| --- | --- |
| Message Type | M |
| N3IWF-C UE E10AP ID | M |
| N3IWF-U UE E10AP ID | M |
| Trace ID | M |

In an embodiment of the disclosure, the existing system utilizes a new interface N4X which is similar to N4 interface, and mostly similar to the PFCP (runs on UDP). The N4X interface is a proprietary interface. While the proposed interface (i.e., the E10 interface) between the N3IWF-C device (100) and the N3IWF-U device (200). The E10 interface has the E10AP protocol that runs on the SCTP. The E10 interface is specific to the N3IWF-C device (100) and/or the N3IWF-U device (200) and is similar to the E1 interface which is used between the gNB-CU-CP and the gNB-CU-UP on the gNB in 5G network. The E1 is a standard 3GPP interface. The proposed method will aim to bring the E10 interface and E10AP into 3GPP standards for global standardisation. The E10AP supports all interface management and bearer context management procedures. The E10AP is lightweight (ASN based) and suitable for the N3IWF CUPS architecture.

Furthermore, the existing system expects (optionally) UP control information from the AMF (170) or UP control information is locally configured. The proposed method doesn't rely on the AMF (170) for UP (user plane) information. The N3IWF-U(s) device (200) register (E10AP: SETUP REQUEST) with the N3IWF-C device (100) with their capabilities during initialization. That would help the N3IWF-C device (100) to choose one of the N3IWF-U(s) device (200). The N3IWF-U device (200) can also send indication to the N3IWF-C device (100) during overload scenarios. So that, the N3IWF-C device (100) can take proper action. The ASN based interfaces (e.g., S1AP, NGAP, E1AP, and X2AP) are widely accepted on access side. Hence, the E10AP is more suitable between the N3WIF-C device (100) and the N3IWF-U device (200).

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling an execution of a non-3$^{rd}$ generation partnership project (3GPP) interworking function (N3IWF), the method comprising:
   splitting a signalling of the N3IWF into a control plane signalling and a user plane signalling, wherein the control plane signalling is handled by a N3IWF control plane (N3IWF-C) and the user plane signalling is handled by a N3IWF user plane (N3IWF-U);
   adding an E10 interface between the N3IWF-C and the N3IWF-U; and
   monitoring the E10 interface, wherein the E10 interface comprises an E10 application protocol (E10AP).

2. The method of claim 1, wherein the monitoring, by the N3IWF-C and the N3IWF-U, of the E10 interface comprises:
   enabling, by the N3IWF-C and the N3IWF-U, a plurality of services between the N3IWF-C and the N3IWF-U, wherein the plurality of services comprises at least one of an interface management service, a bear management service, a trace management service, or a load management service.

3. The method of claim 1, wherein the E10AP runs on a stream control transmission protocol (SCTP) of a transport layer.

4. The method of claim 1, wherein the E10AP comprises user equipment (UE) associated services and non-UE-associated services.

5. The method of claim 1, wherein the E10 interface enables the N3IWF-U to handle Internet protocol security (IPSec) user plane traffic.

6. The method of claim 1, wherein the N3IWF-C selects one of the N3IWF-U from a plurality of the N3IWF-U during a protocol data unit (PDU) session establishment based on a local selection mechanism.

7. The method of claim 1, wherein the N3IWF-C is capable of moving UE context from one N3IWF-U to another N3IWF-U during failure scenarios.

8. The method of claim 2, wherein the interface management service comprises at least one of a reset service, an error indication service, an N3IWF-U E10 setup service, an N3IWF-U E10 setup response, an N3IWF-U E10 setup failure, an N3IWF-C E10 setup service, an N3IWF-C E10 setup response, an N3IWF-C E10 setup failure, an N3IWF-U configuration update service, an N3IWF-U configuration update acknowledge, an N3IWF-U configuration update failure, an N3IWF-C configuration update service, an N3IWF-C configuration update acknowledge, an N3IWF-C configuration update failure, an N3IWF-C configuration service, an E10 release service, or an N3IWF-U status indication service.

9. The method of claim 2, wherein the bear management service comprises at least one of a bearer context setup service, a bearer context release request for the N3IWF-C, a bearer context release request for the N3IWF-U, a bearer context modification for the N3IWF-U, a bearer context modification for the N3IWF-C, a bearer context inactivity notification service, or a data usage report service.

10. The method of claim 2, wherein the trace management service comprises at least one of a trace start service or a deactivate trace service.

11. The method of claim 2, wherein the load management service comprises at least one of a resource status reporting initiation service or a resource status reporting service.

12. A non-3$^{rd}$ generation partnership project (3GPP) interworking function control plane (N3IWF-C) for controlling an execution of a N3IWF, the N3IWF-C comprising:
   a memory;
   at least one processor; and
   an interface controller, operably connected to the memory and the at least one processor, configured to:
      split a signalling of the N3IWF into a control plane signalling, wherein the control plane signalling is handled by the N3IWF-C,
      add an E10 interface between the N3IWF-C and a N3IWF-U, and
      monitor the E10 interface, wherein the E10 interface comprises an E10 application protocol (E10AP).

13. A non-3$^{rd}$ generation partnership project (3GPP) interworking function user plane (N3IWF-U) for controlling an execution of a N3IWF, the N3IWF-U comprising:
   a memory;
   at least one processor; and
   an interface controller, operably connected to the memory and the at least one processor, configured to:
      split a signalling of the N3IWF into a user plane signalling, wherein the user plane signalling is handled by the N3IWF-U,
      add an E10 interface between an N3IWF-C and the N3IWF-U, and
      monitor the E10 interface, wherein the E10 interface comprises an E10 application protocol (E10AP).

14. The N3IWF-U of claim 13, wherein the at least one processor is further configured to:
   enable, by the N3IWF-C and the N3IWF-U, a plurality of services between the N3IWF-C and the N3IWF-U, wherein the plurality of services comprises at least one of an interface management service, a bear management service, a trace management service, or a load management service.

15. The N3IWF-U of claim 13, wherein the E10AP runs on a stream control transmission protocol (SCTP) of a transport layer.

16. The N3IWF-U of claim 13, wherein the E10AP comprises user equipment (UE) associated services and non-UE-associated services.

17. The N3IWF-U of claim 13, wherein the E10 interface enables the N3IWF-U device to handle Internet protocol security (IPSec) user plane traffic.

18. The N3IWF-U of claim 13, wherein the N3IWF-C selects one of the N3IWF-U from a plurality of the N3IWF-U during a protocol data unit (PDU) session establishment based on a local selection mechanism.

19. The N3IWF-U of claim 13, wherein the N3IWF-C is capable of moving UE context from one N3IWF-U to another N3IWF-U during failure scenarios.

* * * * *